(12) United States Patent
Naveh et al.

(10) Patent No.: US 11,294,797 B1
(45) Date of Patent: Apr. 5, 2022

(54) DEBUGGER FOR QUANTUM COMPUTERS

(71) Applicant: Classiq Technologies LTD., Tel Aviv (IL)

(72) Inventors: Amir Naveh, Haifa (IL); Shmuel Ur, Shorashim (IL); Nir Minerbi, Haifa (IL); Ofek Kirzner, Haifa (IL); Lior Gazit, Tel-Aviv (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 17/354,413

(22) Filed: Jun. 22, 2021

(51) Int. Cl.
*G06N 10/00* (2022.01)
*G06F 11/36* (2006.01)

(52) U.S. Cl.
CPC ...... *G06F 11/3664* (2013.01); *G06F 11/3696* (2013.01); *G06N 10/00* (2019.01)

(58) Field of Classification Search
CPC ............. G06F 11/3664; G06F 11/3696; G06F 11/3648; G06F 17/13; G06N 10/00; G06N 7/005; B82Y 10/00
See application file for complete search history.

(56) References Cited

U.S. PATENT DOCUMENTS

| | | | | |
|---|---|---|---|---|
| 10,223,084 B1 * | 3/2019 | Dunn | ................... | G06N 10/00 |
| 2018/0196780 A1 * | 7/2018 | Amin | ................... | G06N 10/00 |
| 2019/0179730 A1 * | 6/2019 | Geller | ................. | G06F 11/3648 |
| 2020/0042882 A1 * | 2/2020 | Liu | ........................ | G06N 10/00 |
| 2020/0311589 A1 * | 10/2020 | Ollitrault | ............... | G06N 10/00 |
| 2020/0311592 A1 * | 10/2020 | Gidney | ................... | G06F 17/10 |
| 2020/0334563 A1 * | 10/2020 | Gambetta | .............. | B82Y 10/00 |
| 2021/0049482 A1 * | 2/2021 | Mezzacapo | ............ | G06N 10/00 |
| 2021/0132969 A1 * | 5/2021 | Smith | .................... | G06N 10/00 |

FOREIGN PATENT DOCUMENTS

| | | | | |
|---|---|---|---|---|
| CN | 1672171 A | * | 9/2005 | ............. G06N 10/00 |
| WO | WO 2019078907 A1 | * | 4/2019 | ............. G06N 10/00 |
| WO | WO 2020168158 A1 | * | 8/2020 | ............. G06N 7/005 |

* cited by examiner

*Primary Examiner* — Kandasamy Thangavelu

(74) *Attorney, Agent, or Firm* — Tutunjian & Bitetto, P.C.

(57) ABSTRACT

A method, system and product relating to quantum computing. The method comprises using a quantum computer to execute a quantum program a plurality of times, wherein during each execution of the quantum program: reaching an intermediate state, wherein the intermediate state is obtained prior to reaching the terminating cycle of the quantum program; and performing a measurement of a qubit at the intermediate state, whereby obtaining a plurality of measurements of the qubit at the intermediate state in a plurality of executions of the quantum program. The method further comprises determining a value of the qubit at the intermediate state based on the plurality of measurements obtained of the qubit at the intermediate state.

20 Claims, 11 Drawing Sheets

DEBUGGER FOR QUANTUM COMPUTERS

TECHNICAL FIELD

The present disclosure relates to quantum and non-deterministic computing in general, and to debugging quantum and non-deterministic programs, in particular.

BACKGROUND

Quantum computing is a computational paradigm that is fundamentally different from classic computing. Classic computing is based on the manipulation of states, defined by a bit string of "0" and "1". These states are logically altered by fundamental operations, or logical Boolean gates (e.g. NOT, AND, NAND etc.), to perform certain tasks. Quantum computing, on the other hand, is based on the manipulation of quantum states, defined by a complex vector with norm 1, also referred to as a density matrix. The length of this vector is 2 to the power of the number of qubits—a physical realization of a two-state system. These states are altered by unitary matrices of the appropriate size, namely the vector length squared. Such matrices can be decomposed by a product of matrices, each a tensor product of 2×2 and 4×4 matrices. In some cases, a quantum computer may be universally programed using a limited sized matrices. For example, the quantum program may be programmed using only 2×2 and 4×4 matrices (and even more specifically, a small set of such matrices will suffice). Using such matrices to control the state of a quantum computer is referred to as "gate level programming". In some cases, other matrices may be used. For example, 8×8 matrices may be utilized (e.g., Toffoli gates).

In quantum software, programming is done at the gate-level or near gate level. Quantum programming software and frameworks, such as Qiskit, CIRQ, Q #, FOREST, braket, silq, all allow user friendly interfaces for gate level programming. Additionally, quite a few building blocks and algorithms exist that perform certain pre-defined functionalities.

BRIEF SUMMARY

One exemplary embodiment of the disclosed subject matter is a method comprising: obtaining a quantum program that involves at least one manipulation of a qubit, wherein the quantum program defines a terminating cycle; using a quantum computer, executing the quantum program a plurality of times, wherein during each execution of the quantum program: reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program; and determining a value of the qubit at the intermediate state based on the plurality of measurements obtained of the qubit at the intermediate state.

Optionally, the value of the qubit indicates a probability distribution of alternative values.

Optionally, the method further comprises: identifying non-negligible values in the probability distribution, wherein non-negligible and negligible values are determined based on a probability threshold, wherein a value having a probability in the probability distribution that is below the probability threshold is considered negligible and a value having a probability in the probability distribution that is above the probability threshold is considered non-negligible; and in response to a command from a user, displaying to the user an abbreviated probability distribution that comprises all the non-negligible values.

Optionally, the method further comprises: determining based on a quality measurement, a number of the plurality of times to execute the quantum program.

Optionally, the method further comprises: in response to a command from the user to continue execution of the quantum program after the intermediate state, executing the quantum program a second plurality of times, wherein during each execution of the quantum program in the second plurality of times, the program is executed from an initial state of the quantum program until reaching a second state, wherein the second state is different from the intermediate state and successive thereto, whereby during the second plurality of times, in each execution, the intermediate state is reached prior to reaching the second state.

Optionally, the method further comprises, in response to a command from the user to update a value of the qubit to a modified value: synthesizing a transformative quantum program based on the value and the modified value; and updating the quantum program to perform the transformative quantum program after the intermediate state, whereby creating a modified quantum program.

Optionally, the method further comprises, in response to a command from the user to continue execution of the quantum program after the intermediate state, executing the modified quantum program.

Optionally, transformative quantum program is a quantum program that is configured to transform a zero value of the qubit to the modified value subtracted by the value.

Optionally, the modified quantum program is utilized instead of the quantum program during a debugging session in which the command to update the value of the qubit was provided.

Optionally a conditional breakpoint having a condition on the value of the qubit is defined at the intermediate state, wherein in response to determining the value of the qubit, evaluating whether the condition holds, and in response to determining that the condition holds, indicating to a user that an execution of the quantum program is paused in a debugging session due to the conditional breakpoint.

Optionally, the method comprises: performing quantum program analysis to determine a value or a property of the qubit at a second state based on the value or the property of the qubit at the intermediate state.

Optionally, the second state precedes the intermediate state, whereby determining the value or the property of a preceding state using information obtained regarding a succeeding state.

Optionally, the intermediate state is a state at a user-defined location, wherein the user-defined location is defined by a user command.

Another exemplary embodiment of the disclosed subject matter is a non-transitory computer readable medium retaining program instructions, wherein the program instructions are configured, when read, to cause a processor to perform: obtaining a quantum program that involves at least one manipulation of a qubit, wherein the quantum program defines a terminating cycle; causing a quantum computer to execute the quantum program a plurality of times, wherein during each execution of the quantum program: reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program; and determining a value of the qubit at the intermediate state based on the plurality of measurements obtained of the qubit at the intermediate state.

Yet another exemplary embodiment of the disclosed subject matter is a system comprising: a memory unit, wherein said memory unit retains a quantum program that involves at least one manipulation of a qubit, wherein the quantum program defines a terminating cycle; and a quantum computer; wherein said quantum computer is configured to execute the quantum program a plurality of times, wherein during each execution of the quantum program: reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program; wherein said system is configured to determine a value of the qubit at the intermediate state based on the plurality of measurements obtained of the qubit at the intermediate state.

Optionally, said system is configured to determine based on a quality measurement, a number of the plurality of times to execute the quantum program.

Optionally, the system comprises a classic processor, wherein said classic processor is configured to execute a quantum debugger, wherein the quantum debugger is configured to cause said quantum computer to execute the quantum program to determine debugging information.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
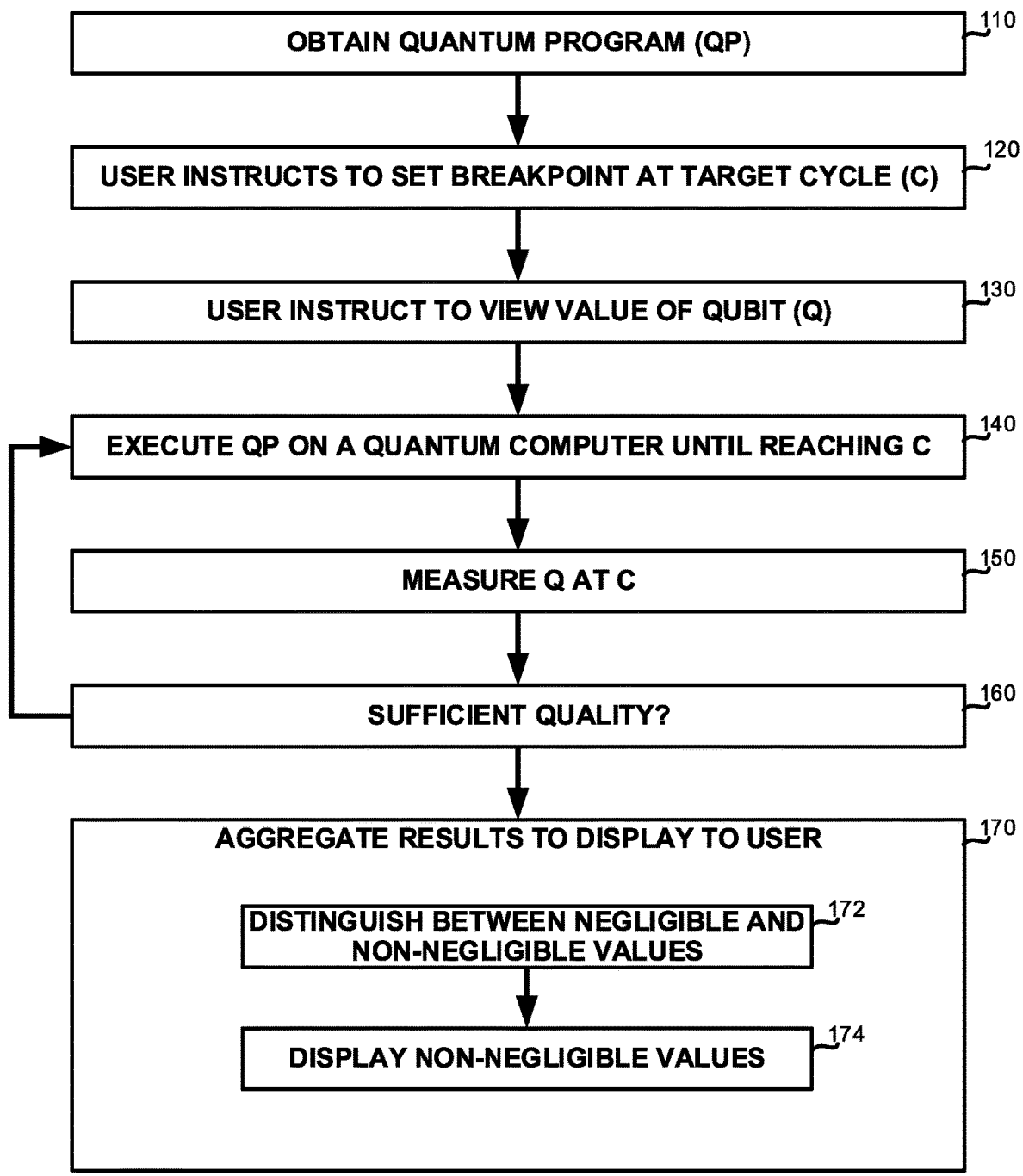
FIG. 1A-1F show flowchart diagrams of methods, in accordance with some exemplary embodiments of the disclosed subject matter.

One technical problem dealt with by the disclosed subject matter is to provide for a quantum debugger. A quantum debugger may be a tool used to test and debug quantum programs. In some exemplary embodiments, the quantum debugger may be enabled to run a target quantum program and permit a user to track its operation, monitor its state or partial state, values of different variables or entities, or the like. In some exemplary embodiments, the quantum debugger may be designed to execute the quantum program on a quantum computer. Specifically, and as opposed to debuggers associated with simulators, the quantum debugger may utilize a quantum execution platform (e.g., the quantum computer) to execute, at least partially, the quantum program being examined. In some exemplary embodiments, the quantum debugger may enable to run or halt the target quantum program at specific points, display the contents of qubits, modify value of qubits, or the like. The quantum debugger may be utilized by a developer or other user to identify mistakes in the quantum program, such as by exploring the state of the program, in executing other options to enable a debugging process.

However, in order to look at the value of a variable in quantum programs, measurement of the value is performed, such as via sampling of a probabilistic result. When sampling is performed, the distribution may collapse, which may affect the execution of successive cycles. In some exemplary embodiments, execution of the successive cycles after the distribution collapsed, provides a different result than that of the quantum program. In some cases, stopping a quantum program in the middle affects the quantum state, and prevents continuing execution therefrom, as may be desired as part of a debugging process.

It is further noted, that assertion-based debugging may be a naïve an inefficient debugging manner. Assertions may be added to the quantum program to understand, at different cycles, if desires properties are held. However, such debugging paradigm requires users to manually manipulate the quantum program and provides a limited set of abilities.

It may be desired to provide a quantum debugger that is capable of versatile abilities, including but not limited to stopping the program at desired locations or upon meeting desired conditions; inspecting a value of a variable mid-program; continuing execution of the program after value inspection; setting values to variables mid-program and continuing execution thereafter with the modified value; or the like.

In some cases, during debugging, the user may desire to investigate quantum-related properties, such as entanglement level between qubits, entanglement pattern, or the like. In some exemplary embodiments, quantum entanglement may be a physical phenomenon that occurs when a pair or group of particles are generated, interact, or share spatial proximity in a way such that the quantum state of each particle of the pair or group cannot be described independently of the state of the others.

Additionally or alternatively, all quantum operations should be reversible in quantum computing. However, setting of a value to a variable, mid-program, may not be a reversible operation. A technical solution for enabling setting a value of a variable without destroying desirable properties of the quantum program may be desired.

In general, the state of a qubit or the state of several qubits, within a circuit may be represented by a complex state vector of $2^n$ complex numbers, where n represents the number of qubits whose state is inspected (which may include all qubits of the quantum program or portion thereof). In some exemplary embodiments, the quantum state may be a $2^n \times 2^n$ matrix, referred to as the density matrix. Measurements can, in theory given enough resources, fully reconstruct the density matrix, or state vector, including the phase, depending on how many resources are invested in the measurement. For the clarity of disclosure and without limiting the disclosed subject matter, the disclosed subject matter is described while focusing on a property that is derived from the density matrix—a distribution of different potential values. Such focus should not be construed as a limitation on the disclosed subject matter, which may relate to any property derived from the density matrix and to the content of the density matrix itself (e.g., the complex state vector of $2^n$ complex numbers, the $2^n \times 2^n$ matrix itself, or the like). In some cases, any information derived from the density matrix, can be derived from measurements, and vice versa.

Another technical problem may relate to efficiently execute a quantum or non-deterministic program a plurality of times. In some cases, the same program may be re-executed to determine non-deterministic values, such as distribution of values, quantum states, or the like. Execution of the program may require substantial execution resources, and it may be desired to provide a more efficient manner of executing the same program over and over, while obtaining potentially different results.

As an example, a simulation software, implemented using classic software, may provide non-deterministic results. The simulation software may simulate traffic in a city. It may be desired to determine instead of or in addition to the specific value of variable in an execution, a distribution of values that the variable may receive. For example, it the traffic simulation, it may be desired to determine how many cars are used in the simulation. In different executions of the non-deterministic simulation, the number of cars may vary. In some exemplary embodiments, the user may inquire about a distribution of values of variable at a specific program location. In some exemplary embodiments, the user may utilize a debugger and instruct the debugger to provide the distribution of values. Additionally or alternatively, the user may desire to review the final output of the program and review distribution thereof, with or without the use of a debugger. In all of these cases, in order to obtain the requested information, the classic software may need to be re-executed a plurality of times.

Similarly, when a value of a qubit is investigated, it may be required that the same quantum program be re-executed a plurality of times.

Yet another technical problem may relate to providing improved user experience (UX), when programming software that relate to quantum states and distribution of values. In some exemplary embodiments, the user may decide to set a distribution of values in a direct manner as part of the programming of the software. For example, the user may decide to program a classic software to receive values in accordance with a distribution. As another example, the user may desire to set a specific qubit to have a specific distribution. The specific distribution may be a-priori defined, may be based on the current value of the qubit being manipulated, may be based on the current value of another qubit being manipulated, may be based on current values of variables utilized by the program, or the like.

One technical solution is to execute the quantum program on the quantum computer a plurality of times, and during each time halting execution at a same target intermediate state. The target intermediate state may be defined based on a breakpoint, a conditional breakpoint, based on a previous state (e.g., "step" operation to reach a next state), or the like. In some exemplary embodiments, the target intermediate state may be defined as a specific cycle in the quantum program. In some exemplary embodiments, the intermediate state may be a state that precedes terminating states of the quantum program. The terminating state of the quantum program may be states that are the outcome of executing the last cycle (also referred to as "terminating cycle") of quantum program. In some exemplary embodiments, the target intermediate state, therefore, may be any state that is defined in any cycle that is not the last cycle of the quantum program. In some exemplary embodiments, the intermediate state may be a state different than the state at which the quantum program is configured to finish execution.

In some exemplary embodiments, in each execution of the quantum program, a measurement of a target qubit (or a set of target qubits) may be performed. For example, a value of the qubit may be determined and used to determine a probability distribution of alternative values based on the probability that each value is measured. Additionally or alternatively, properties relating to the quantum state may be determined, such as but not limited to entanglement. Additionally or alternatively, quantum tomography may be performed. In some exemplary embodiments, quantum tomography may be the process by which a quantum state is reconstructed using measurements on an ensemble of identical quantum states. In some exemplary embodiments, the quantum tomography may be performed with a predetermined limited set of resources (e.g., number of executions, time, processing power, or the like). Additionally or alternatively, the quantum tomography may be performed until reaching a desired quality level (e.g., confidence level in measurement, estimated statistical deviation, or the like).

In some exemplary embodiments, based on the observed measurements obtained from actual execution of the quantum program by a quantum computer, when reaching the target intermediate state, the value of the target qubit (or set of target qubits) may be determined. In some exemplary embodiments, the number of executions performed may be determined based on a quality measurement, such as provided by the user, obtained from a predefined configurations or preferences, or the like.

In some exemplary embodiments, the value may be presented to the user. As an example, the user may be developer performing a debugging session and investigating the quantum program. The user may instruct a quantum debugger in accordance with the disclosed subject matter to display a value of a target qubit (or set of target qubits). In some exemplary embodiments, the display may include any display of any property of the target qubit. For simplicity of disclosure, consider a display of a distribution of values of the set of qubits. In some cases, only non-negligible values may be displayed to the user, forming an abbreviated probability distribution, to provide a coherent display that can be comprehended by a human user, instead of a full probability distribution.

In some exemplary embodiments, the user may instruct the quantum debugger to continue execution after the target intermediate state. For example, the user may instruct the quantum debugger to execute a single cycle (e.g., "step" command). Additionally or alternatively, the user may instruct the quantum debugger to continue execution until reaching a next breakpoint (e.g., "run" command). Such commands may continue the execution of the quantum program in the same debugging session. However, as opposed to traditional debuggers, the quantum debugger may execute the quantum program a plurality of times until reaching a second target state (e.g., next cycle in case of a "step" command; a next cycle in which a breakpoint is defined in case of a "run" command; or the like) from an initial state and not from the intermediate state. In such a manner, although the execution appears to the user as being continued, it is actually restarting to ensure the quantum state was not modified (collapsed) to the measurements performed at the intermediate state.

In some exemplary embodiments, the user may instruct the quantum debugger to update a value of a qubit or set of qubits. For example, the user may execute a "set" command. In order for the operation to be reversible, instead of setting the value, a controlled propagation operation may be implemented, in which the value of the qubit is modified. A transformative quantum program that is configured to transform the value of the target qubit from its observed value (V1) to a target value (V2) may be synthesized. For example, the transformative quantum program may be configured to perform for the target qubit (Q) the following computation: Q=Q−V1+V2. In some cases, the transformation quantum program may be a program that is configured to transform a zero value (0) of the qubit to the modified value (V2) subtracted by the value (V1). The transformative quantum program may then be introduced to the quantum program in a manner causing the transformation of the value to be applied on an addition to the qubit value. In some exemplary embodiments, the transformative quantum program may be applied to the qubits, as a program, after the cycle in which the user asked for the controlled propagation command to be performed. In some exemplary embodiments, the quantum program may be updated so as to perform the transformative quantum program immediately after the target intermediate state. The modified quantum program that is created may be utilized for the remainder of the debugging session. Hence, when the user requests to continue execution (e.g., "step", "run"), the modified quantum program may be executed and not the original quantum program. It is noted that such operation is different from traditional debuggers in which "set" operations update the memory space but do not alter the code section of the process executing the program.

In some exemplary embodiments, the user may set a conditional breakpoint for a debugging session. The conditional breakpoint may be set on a specific cycle or generally on all cycles. The conditional breakpoint may be associated with a condition on a value of a target qubit(s). In each cycle where the conditional breakpoint is applicable, the quantum debugger may determine the value of the target qubit, in accordance with the disclosed subject matter. The quantum debugger may evaluate whether the condition holds based on the value of the target qubit. If the condition holds the execution may be halted at the relevant cycle and a measurement may be obtained of the qubit(s) in the relevant cycle. In some exemplary embodiments, the user may utilize the GUI of the quantum debugger to investigate the properties of the program when the breakpoint is activated. For example, the user may request to view values of qubits. In some exemplary embodiments, the user may utilize the GUI to set values for qubits, perform "step" operations, or the like. Such operations may cause the quantum debugger to concatenate additional operations after the conditional breakpoint is activated (e.g., executing an additional cycle, synthesizing a transformative quantum program to be executed after the breakpoint is activated, or the like). In some exemplary embodiments, the user may add new breakpoints, update or remove existing breakpoints, or the like.

In some exemplary embodiments, the quantum debugger may utilize previously determined value or property of a qubit in a specific state to determine value or property of the qubit in another state. In some exemplary embodiments, quantum program analysis may be employed.

As an example, based on a determination of quantum entanglement in cycle 150 between qubits Q1 and Q2, a determination of the quantum entanglements between the two qubits (Q1, Q2) in cycle 160 may be derived. For example, if in the intermediate cycles, both qubits were not manipulated in a manner affecting entanglement, it may be determined that the entanglement between them remains the same, even without executing the quantum program. As another example, a distribution of values of qubit Q1 on cycle 150 may be utilized to determine the distribution of values of qubit Q1 on cycle 160. Consider if in the cycles between 150 and 160 there are only simple operations, the simple computations may be applied for each value in the distribution, and the target distribution in cycle 160 may be considered to be with the same probabilities and with the computed values.

In some exemplary embodiments, there may be a determination whether to utilize static analysis or dynamic analysis in order to determine values or properties of qubits. While the default may be to perform dynamic analysis, when the chance arises, and if it is considered as preserving or reducing resources required for the debugging process, static analysis may be utilize, in which quantum queries can be replied to, based on knowledge gleaned from previous queries.

In some exemplary embodiments, the static analysis may utilize information from succeeding cycles to determine values or properties. For example, using information from cycle 160, a value or property regarding cycle 150 may be determined. This may utilize the reversibility property of quantum programs. It is further noted that in some cases, the user may instruct the quantum debugger to perform a "step back" operation, going back one cycle. As can be appreciated, this backward traversal is different from traversing an existing trace which was previously calculated and is merely presented, as may be the case in simulators. Instead, the disclosed subject matter, utilizes values from "future" cycles to determine values of "past' cycles.

Another technical solution may be to utilize impact analysis on the program to determine potential portions thereof that can impact the investigated result. Instead of re-executing the entire program, the program may be modified without affecting the outcome. In some exemplary embodiments, lightcone analysis of a quantum program may be performed to identify potential portion of the quantum program that can be dropped. As another example, the analysis may be aware of quantum properties of different quantum gates. Some gates may be considered as "partial impacting gates", such as SWAP gate, where the outcome of different outputs of the gate may be affected by only a portion of the qubits that are inputted thereto. In contrast, full impacting gates, such as CNOT gates, CZ gates, Toffoli gates, or the like, may be affected and potentially affect the value of each qubit inputted thereto. Based on the differentiation between partial impacting gates and full impacting gates, different impact analysis may be performed.

In some exemplary embodiments, in view of the impact analysis, portion of the program that do not affect the investigated variable may be removed to reduce required resources for execution. For example, the number of cycles in a quantum program may be reduced, the number of qubits utilized in a quantum program may be decreased, the amount of memory to be utilized by a classic program may be reduced, certain functions and methods may be omitted and execution thereof may be spared in a classic program, or the like. The modified program may be compiled and executed instead of the original program.

In some exemplary embodiments, preprocessing may be performed to create a modified program, P', instead of the original program P. The modified program may require reduced amount of resources, compared to P, while being equivalent to P with respect to a partial execution result that is of interest. In some exemplary embodiments, execution of P' may be faster, utilize reduced amount of memory or other resources, or the like. In some exemplary embodiments, there are multiple optimization that can be performed to create modified program P'. In some exemplary embodiments, different optimizations may be different pre-processing overhead and may yield different execution improvements. An optimization may be denoted $O_i$, the modified program obtained based on performing optimization $O_i$ may be denoted as $P(O_i)$. Additionally or alternatively, a plurality of optimizations may be utilized in conjunction. As an example, if both optimizations $O_i$ and $O_j$ are implemented the modified program obtained may be $P(O_i,O_j)$. Preprocessing overhead of performing optimization $O_i$ may be denoted as $C(O_i)$ Execution cost of executing a program P may be denoted as $C(P)$, hence $C(P(O_i))$ may denote the execution cost of a single execution of the modified program obtained by implementing optimization $O_i$. In some exemplary embodiments, the optimizations may be implemented in order to reduce the costs of obtaining the partial execution result that is of interest. In accordance with the disclosed subject matter, the partial execution result may require N executions. Hence, the entire cost of obtaining the partial execution result using the original program may be denoted as $N \cdot C(P)$. Using optimization $O_i$ the execution cost is $C(O_i)+N \cdot C(P(O_i))$. Hence, the optimization $O_i$ should be used only if $C(O_i)+N \cdot C(P(O_i))<N \cdot C(P)$. In some cases, the preprocessing costs and the execution benefit (e.g., $C(P(O_i))/C(P)$) may be unknown in advance. In some exemplary embodiments, prediction of the expected costs may be utilized, such as based on the problem and statistics. In some exemplary embodiments, the prediction may also take into account the execution platform, compiler information and gate usage statistics by the program, as in some cases different gates may yield different performance on different execution platforms. If an optimization can eradicate the use of a specific gate type that performs poorly on the existing execution platform, such optimization may be predicted to yield a relatively significant performance improvement. In some exemplary embodiments, a quality and cost evaluation may obtain the program and one or more potential optimizations, and provide an estimation as for the expected overhead cost as well as estimated reduction in execution costs in view of the optimization. Based on the number of iterations (N) to be performed, based on estimated or measured execution cost of the original program ($C(P)$), and based on the estimated overhead costs and reduction in execution costs for each potential optimization (or combination of optimizations), the optimization to be performed may be selected. In some cases, after the optimization is performed, the actual metrics may be measured and utilized to improve future predictions, selections, or the like. In some exemplary embodiments, if the estimated outcome of the optimization and the actual measured outcome differ, it may be re-evaluated whether to select a different optimization. Assuming optimization $O_i$ was selected, a different optimization (or combination of optimizations) $O_j$ may be selected and applied on the original program in case $C(O_j)+N \cdot C(P(O_j))<N \cdot C(P(O_i))$. In some cases, the optimization may be performed on the optimized program $P(O_i)$. Such optimization may be selected if $C(O_j)+N \cdot C(P(O_i,O_j))<N \cdot C(P(O_i))$. In some cases, the optimization may be performed on the original program instead of on the optimized program if $C(P(O_j))<C(P(O_i,O_j))$.

Yet another technical solution is to enable a programmer to utilize operations to propagate a quantum state to a qubit, a distribution value, or the like, in a controlled manner. In response to such an instruction, a transformation quantum program that is configured to modify the current distribution value to become the target distribution value may be generated and added to the quantum program. In such a case, the programmer may be provided with a relatively easy interface to provide complicated coding instructions.

Similarly, programmers of classic software, such as simulation software, may also make use of such instructions. In some exemplary embodiments, the programmer may define, such as in a debugger or when coding the program itself, to set a distribution value to a variable. For example, the instruction may be x=Distribution D{(20%, 3), (50%, 5), (30%, 8)}. During execution of the program, the value of variable x may be sampled from distribution D. In each execution, the value of x may differ, but overall the values of x, when set, would have the desired distribution. In some cases, x may already have a certain distribution, defined explicitly (e.g., using another set distribution operation) or implicitly (e.g., as a result of non-deterministic operation of the code). The programmer or user may set or modify the distribution value of x over all executions, based on its original distribution. As an example, the operation may manipulate the value of x (e.g., increase x by 1, would change distribution D above to D'{(20%, 4), (50%, 6), (30%, 9)}). As another example, the operation may manipulate only some of the values. As an example, if only the value of 3 is multiplied by ten, distribution D may be modified to D"{(20%, 30), (50%, 5), (30%, 8)}. In some cases, the probabilities of each value may also be modified, such as setting a specific value to be a distribution. As an example, instead of the value 3, a distribution $D_2${(50%, 3), (50%, 5)} may be set. In such an example, distribution D may be modified to D'''{(10%, 3), (60%, 5), (30%, 8)}. In some exemplary embodiments, the value of x may be manipulated using values, singular or distribution, of other variables, such as y, referring to the example above, $D_2$ may be the distributed value of y.

One technical effect of utilizing the disclosed subject matter is to provide a solution enabling debugging of quantum programs. Such solution provides for direct debugging of the program when executed on quantum computer, and does not rely on simulators. As quantum computers are utilized, more complex program can be executed, without requiring a traditional computer to simulate quantum computations. The solution may provide for "standard" debugging user interface (e.g., enabling debug commands such as "step", "run", "break", "conditional break", "set", "step back", etc.), in a non-standard computerized environment.

Another technical effect of utilizing the disclosed subject matter is providing for human-comprehensible output, by disregarding negligible results. As quantum computers may inherently involve some statistical error in values, displaying all values may be redundant and prevent a human user from being able to perform meaningful debug operation. The disclosed subject matter, enables the human user to comprehend the meaningful information while blocking non-meaningful information from view.

Yet another technical effect is the ability to compute values for qubits based on values of qubits in other cycles, which may be succeeding or preceding cycles. The analysis used can reduce a number of executions of the quantum computer required in order to obtain information that meets a desired quality level.

Yet another technical effect may be to reduce required resources to investigate a quantum program. In some exemplary embodiments, the modified quantum program that is generated may include a reduced amount of qubits, cycles, or the like. In some exemplary embodiments, the modified quantum program may be executed using reduced resources of the execution platform, in comparison with the original quantum program.

Yet another technical effect may be to reduce required resources to investigate a classic non-deterministic program that has distribution of values over several executions. The user may investigate the distribution of values, manipulate such distribution using "controlled propagation" operation regarding distributions, or the like. In some exemplary embodiments, such investigation may be performed by executing the program a plurality of times, and the disclosed subject matter may improve performance and reduce overall required resources, such as time, CPU, memory, or the like, by modifying the program and executing the modified program instead of the original program.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIGS. 1A-1F showing flowchart diagrams of methods, in accordance with some exemplary embodiments of the disclosed subject matter. Reference is initially made to FIG. 1A.

On Step 110, a Quantum Program (QP) may be obtained. The quantum program may be a program to be debugged. In some exemplary embodiments, a quantum program may be constructed out of layers. Each layer may be a tensor product of a certain fixed set of gates. A quantum program may be a matrix, defined by a product of layers $L_1 \cdot L_2 \cdot \ldots \cdot L_d$. The number of layers d may be referred to as the depth of the circuit. In some exemplary embodiments, a quantum program over n qubits may be a unitary operator $U_n$. In some exemplary embodiments, $U_n$ may be a matrix of $2^n \cdot 2^n$. $U_n$ may be a unitary matrix, a matrix that is if multiplied by a vector with norm of 1, outputs a vector with norm of 1. In some cases, a unitary matrix may be a quantum program, in which unitary operations (gates) are applied on the qubits. Additionally or alternatively, valid quantum state, denoted as $\psi$, may be a vector of size $2^n$ with a norm of 1. The execution of the quantum program may be the multiplication of the state $\psi$ by the unitary matrix $U_n$, resulting in an output state. It is noted that the gates may comprise logical gates (e.g., AND, OR, XOR, or the like), qubit gates (e.g., $U_3$ $(\theta, \phi, \lambda)$ gate, Hadamard gate (H), controlled not gate (CX, CNOT), controlled Z gate (CZ), toffoli gate, swap gate, phase shift gate ($R_\phi$), Pauli-X gate (X), Pauli-Y gate (Y), Pauli-Z gate (Z), or the like), or the like.

On Step 120, the user may provide an instruction to the quantum debugger. In some exemplary embodiments, the user may utilize a Graphical User Interface (GUI) or another Human-Machine Interface (HMI) to provide instructions to the quantum debugger. In some exemplary embodiments, the user may instruct the debugger to add a non-conditional breakpoint at a target cycle (C). Such an instruction may cause the quantum debugger to stop execution when reaching cycle C. It is noted that many breakpoints may be set within the same debugging session. The first breakpoint that is reached and which is active (e.g., in case of a conditional breakpoint) may cause the execution to stop at the corresponding cycle.

On Step 130, the user may instruct to view the value of a target qubit, denoted as Q. The instruction may be provided via the GUI of the quantum debugger. It is noted that in some cases, until such instruction is provided, the quantum program may not be executed. This may be the case even if the quantum debugger provides the user with a GUI indicating that the execution has started and was halted at cycle C in view of the breakpoint defined on Step 120. In some exemplary embodiments, the execution of the program may be performed only when a debug statement, such as "print value", "set", or the like, are required to be performed.

Steps 140-170 may be performed to satisfy the user instruction of Step 130. On Steps 140-160, the quantum program may be executed on a quantum computer a plurality of times. In each execution, the quantum program may not be allowed to complete execution (e.g., reach a last cycle of the quantum program), but instead may be halted when reaching cycle C (Step 140). The quantum state which exists when reaching cycle C may be referred to as an intermediate state as such state is intermediate between an initial state and a last state of the quantum program. The value of the qubit(s) Q may be measured in the intermediate state (Step 150). The number of executions of the quantum program may be determined based on whether a desired quality measurement was reached (Step 160). The quality measure may relate to statistical properties of the gathered information, such as the standard deviation of the measurements, estimated confidence in the result, or the like. In some cases, when performing more executions and gathering more information, it may be determined the amount of added information gained by such additional executions to determine if the target quality measurement was reached. Additionally or alternatively, instead of or in addition to tracking quality measurement, a time limit or another limit on utilized resources may be determined and upheld, such that that when the resources are exhausted, no additional executions are performed. The gathered results may be aggregated and displayed to the user (Step 170) as a response to the user's instruction of Step 130.

In some exemplary embodiments, the debug command may instruct displaying information regarding a plurality of qubits. In some exemplary embodiments, the value may be a density matrix. Additionally or alternatively, the displayed information may be derived from the density matrix (or computed directly). As an example, the user may be interested in a distribution of values of the set of qubits. The size of the distribution may be exponential in the number of qubits. In some exemplary embodiments, If the user asks to see the distribution on a relatively small number of qubits (e.g., below a threshold), such a distribution may be measured by testing. If the number of qubits chosen is large (e.g., above the threshold), then displaying the entire distribution may be problematic as the information may be non-comprehensible to a human user. Values that are never seen (e.g., 0 instances), or values with low probability (e.g., having a probability below a threshold), may be omitted from the display.

In some exemplary embodiments, in order to determine the distribution, the operation may receive as input the quantum program, a location and a set of n qubits to be evaluated, a quality measure, a limit on resources, or the like. The created distribution may be a set of valuation evaluated n qubits where each valuation has a value in $(0,1)^n$ and probability (e.g., a real number attached to the valuation) such that the sum of the real numbers of all the non-zero valuation is less than one. As an example, the distribution may be, for example, five valuations with total probability of 60%, and the rest (i.e., remaining 40%) are unknown. In some exemplary embodiments, the operation may fail to be done in a time limit or within a limitation on available resources. Additionally or alternatively, there may be a limit on the number of valuations shown in the distribution, such as defined by the user expecting to see not more than a predetermined number of values. In some cases, it may find more states than the valuation limit, in which case the operation may stop.

In some exemplary embodiments, if the number of qubits is small (e.g., below a threshold of 3 qubits, 4 qubits, 5 qubits, or the like), the quantum program may be executed a multiple time, for example 1024 times, to gather observed valuations and assign to each of which a respective probability based on the number of times it was observed.

In some exemplary embodiments, if the number of qubits is large (e.g., above the threshold), the potential number of valuations may be huge. For example, if there are 100 qubits, and the quantum program is simply applying gate H to each, the size of the state space may be $2^{100}$ valuations all having positive, equal, probability. Such a space may be hard to present to the user in an explicit manner. In some exemplary embodiments, the potential number of valuations may be huge, but only a small subset thereof has non-negligible probability. It is noted that zero probability may be considered negligible. However, due to statistical errors, valuations which theoretically should not be provided by the quantum program, may be observed in reality. Such valuations may be observed a relatively small number of times, which may be considered as negligible probability. In some exemplary embodiments, negligible and non-negligible values may be distinguished based on their respective probabilities being below or above a probability threshold, respectively (Step 172). The output presented to the user may be limited to only display non-negligible values (Step 147), thereby providing a human-comprehensible result. The probability threshold may be set by a user, determined automatically, or the like. In some exemplary embodiments, the probability threshold may be determined based on an estimated error rate; based on a number of potential valuations; based on a mean, median, average of the probabilities in the distribution; based on predetermined percentile of the probabilities in the distribution, such as 30% percentile, 40% percentile, 60% percentile, 80% percentile, or the like; or the like.

In some exemplary embodiments, the debugger may execute the quantum program multiple times to provide an output to the user. With the sampled results the debugger gets a set of valuations each with the number of times it was found. For example, after running 100 times and getting value $v_1$ 50 times and other 50 values ($v_2 \ldots v_{51}$) each a single time. Based on such information, the disclosed subject matter may estimate the probability of value $v_1$ to be about 50%. As for the probability of each other value—no information may be determined due to a small sample (e.g., below a threshold of 30 instances, for example). In order to investigate the additional valuations, the quantum program may be modified to prevent the value of $v_1$, for which sufficient information is available to provide a probability with a confidence measurement that is above a minimal threshold. After such modification, the modified quantum program may be executed to investigate other valuations with significant lower probabilities. For example, consider determining after an initial examination that 50% of the time, the value is $v_1$ and 30% of the times the value is $v_2$. The modified quantum program may be modified so as to prevent the values of $v_1$ and $v_2$. Hence, the modified quantum program may provide the relative probability of the remaining 20% of the valuations. If value $v_3$ is identified as appearing 25% of the time in the modified quantum program, the value $v_3$ may be assigned the probability of 5% (20%·25%=5%). Such modification enables the disclosed subject matter to identify the distribution using a reduced number of executions. The modified quantum program may be more efficient in finding valuations with lower probabilities. In some exemplary embodiments, the modified quantum program is utilized only to determine the value of the set of qubits being investigated. When additional examinations are performed, such as in response to another debug command from the user, the modified quantum program may not be utilized. Instead, the quantum program that was analyzed may be utilized. Put differently, the modified quantum program utilized to examine less common valuations is used only to provide the response to the debug command and is not continued to be used during the same debugging session.

In some exemplary embodiments, quantum tomography may be utilized to reconstruct a quantum state (or portion thereof) using measurements on an ensemble of identical quantum states. The source of these quantum states may be any device or system which prepares quantum states either consistently into quantum pure states or otherwise into general mixed states. In some exemplary embodiments, given a set of qubits, tomography may be utilized to interrogate and find their state. In some exemplary embodiments, with enough measurement, the state of the qubits can be determined was using measurement. In some exemplary embodiments, the user may specify what he wants to see. For example, the user may provide commands to the quantum debugger indicating desired properties for the tomography process. For example, the user may limit the time or resources utilized for measurement, target accuracy, specific information desired (e.g., information on axis X, axis Y, axis Z, combination thereof, or the like), minimal probability of valuation to be displayed, properties of the density matrix, entropy of measurements, entanglement between qubits or other quantum properties, or the like.

In some exemplary embodiments, tomography may be performed by adding gates after the quantum state, to assist in measuring the quantum state. As an example, if the accuracy of the measurement is between 6 and 7, while the actual number is 6.4, a gate adding 0.5 can be applied, and if the measurement thereafter is still 6, then the value is between 6 and 6.5. Such process can be continued, such as using binary search, until reaching a desired level of accuracy.

In some exemplary embodiments, it may be checked whether the quantum state obtained is pure or not. Quantum states that cannot be written as a mixture of other states are called pure quantum states, while all other states are called mixed quantum states. A pure quantum state can be represented by a ray in a Hilbert space over the complex numbers.

Figure 1B:
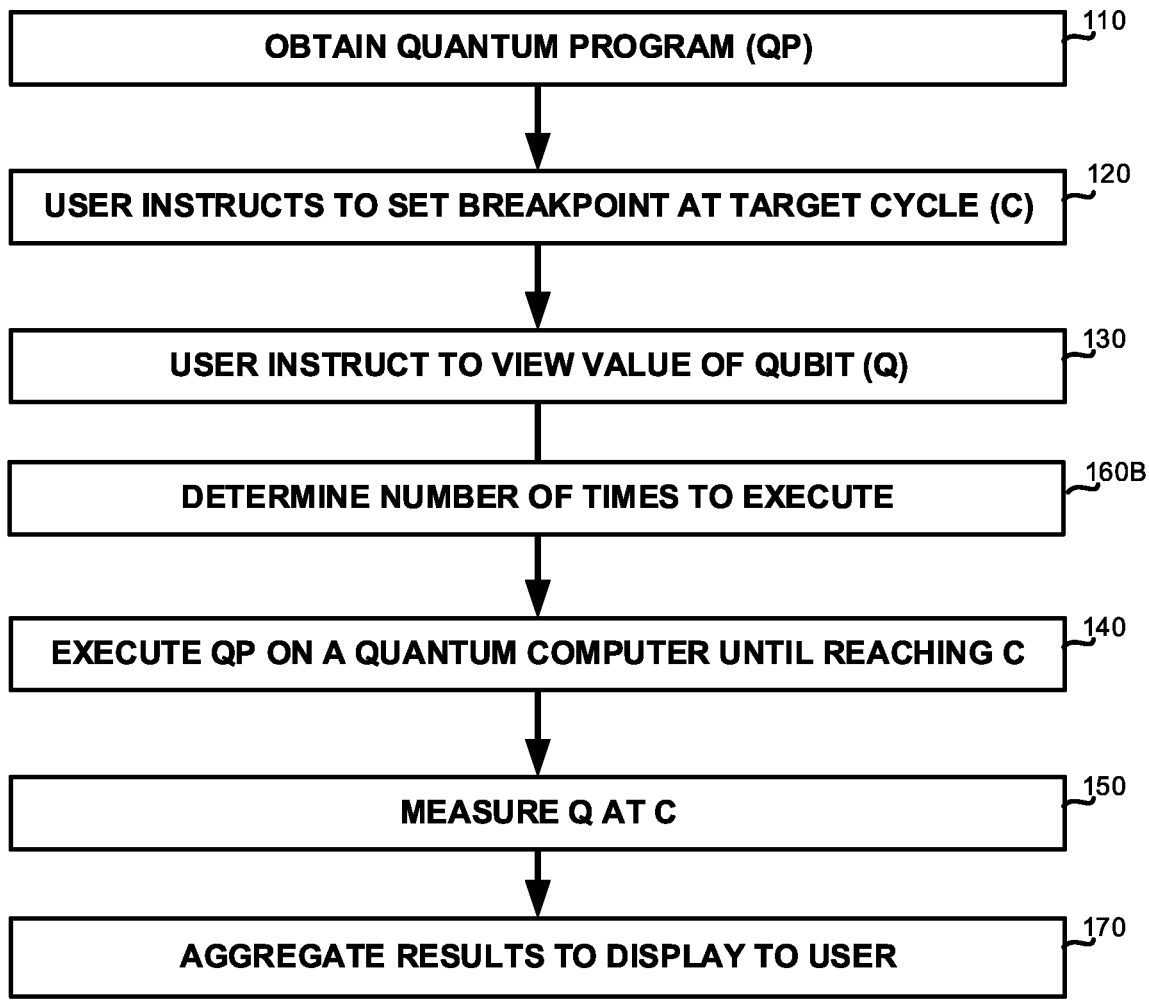

Referring now to FIG. 1B, showing an embodiment in which the number of executions is determined a-priori (Step 160B). Steps 140-150 are performed a number of times that was determined on Step 160B. It is noted that the determination may be based on predetermined time limit, resource limit, target quality measurement, or the like. Additionally or alternatively, the number of times to execute may be modified after executing some or all of the executions of Steps 140-150.

Figure 1C:
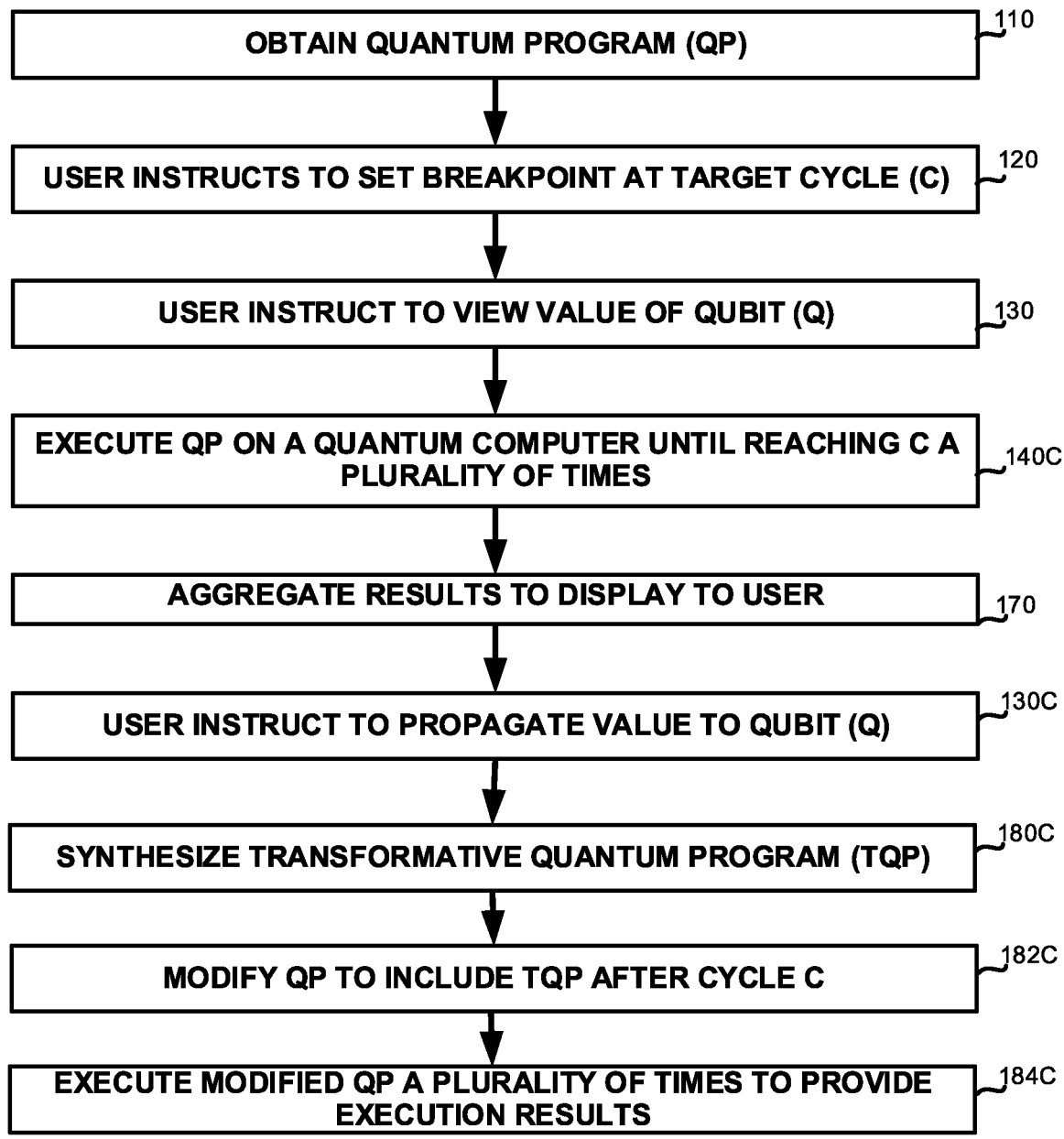

Referring now to FIG. 1C, in which the multiple executions are represented by Step 140C. After the quantum debugger provides the response to the user instruction that was provided on Step 130, e.g., after Step 170, the user may provide additional debug commands to the quantum debugger.

On Step 130C, the user provides an instruction to propagate a target value to qubit(s) Q. The target value may be a modified probability distribution, a modified density matrix, or the like. In some exemplary embodiments, the "controlled propagation" instruction may be an instruction to set the distribution to a predetermined or pre-calculated distribution; to set the distribution taking existing results into account, such as by changing values in the distribution without affecting their probability or by changing values or probabilities of existing values in the distribution; to set the distribution taking into account other variable(s), such as other qubits and their density matrix or distribution; or the like.

In some exemplary embodiments, the propagating of a different distribution may enable the user to define a distribution in an explicit manner. For example, the input may be a set of pairs $(p_i, v_i)$, where $p_i$ is the probability and $v_i$ is the valuation of the i-th entry in the distribution. Additionally or alternatively, the user may provide a quantum pure state, which may be represented by a vector. Additionally or alternatively, the state can be a mixed, non-pure, state, which may be represented using a matrix. Additionally or alternatively, the new value may be determined using the existing distribution. For example, given original distribution represented by pairs $(p_i, v_i)$, where $p_i$ is the probability and $v_i$ is the valuation, the new distribution may be computed using the function $f_i$ such that the new distribution $(p_i, f_i(v_i))$. In some cases, $f_i$ may be identical for all i values or may be different for different i values. Consider the following example of distribution: D={(20%, 5), (80%, 8)}. The new distribution may increase all values by 1, using the following functions: $f_1(x)=f_2(x)=x+1$. The new distribution may increase only the value of 5 by 1 using the following functions: $f_1(x)=x+1$; $f_2(x)=x$. The new distribution may split the value of 5 to 5 in 30% of the cases and to 6 in the remaining 70% using the following functions:

$$f_1(x) = \begin{cases} x+1 & 70\% \\ x & 30\% \end{cases}.$$

Applying such function may result in the following distribution: {(14%, 6), (6%, 5), (80%, 8)}. In some exemplary embodiments, the operation may depend on the value of another variable, such as qubit Z.

On Step 180C, the quantum debugger may synthesize a transformative quantum program, denoted TQP. The TQP may be a quantum program snippet that is configured to modify the zero value to a predetermined value. The predetermined value may be the difference between the target value and the existing value. Put differently, if the value determined on Step 170 is V1, and the target value is V2, the TQP may be configured to transform the zero value to V2−V1.

In some exemplary embodiments, the TQP may be computed in accordance with the following scheme. Assume we begin with a pure state $\varphi_1$, and we wish to create a quantum sub circuit (the TQP) that takes $\varphi_1$ to $\varphi_2$. $U_1$ may be a unitary that takes (pond transforms it into the zero state $|00\ldots 0\rangle$. $U_2$ may be a unitary that takes the zero state $|00\ldots 0\rangle$ and transforms it into $\varphi_2$. Accordingly, given state $\varphi_1$, state $\varphi_2$ can be computed as follows: $\varphi_2 = U_2 U_1 \varphi_1$. Put differently, the TQP can be based on $U=U_2 U_1$. U may be decomposed to primitive gates, using known methods, to synthesize the desired circuit, TQP.

In some exemplary embodiments, $U_2$ can be built as follows. The first column of the matrix $U_2$ may be set to be $\varphi_2$. The matrix $U_2$ may be completed into a unitary matrix. In some exemplary embodiments, this can be achieved by filling the next columns of $U_2$ with random complex numbers to receive the matrix and perform ortho-normalization of the columns of the matrix, using the Gram-Schmidt method. After this process $U_2$ is unitary, and is configured to receive the zero state and calculate state $\varphi_2$.

In some exemplary embodiments, $U_1$ can be built using a similar technique by creating the matrix that receives the zero state and calculates state $\varphi_1 \cdot U_1$ may be the inverse of the calculated matrix. Inversing the matrix may be performed by decomposing the matrix to basic gates and then synthesizing a circuit in which the gate order is reversed and each gate is inversed.

In some cases, transition between quantum states may be implemented without the use of any auxiliary qubits. Additionally or alternatively, in some cases, such as for example in mixed quantum states, the transition may require the usage of auxiliary qubits. In some exemplary embodiments, the TQP may utilize more qubits than the program itself utilizes. Additionally or alternatively, the TQP may require to allocate a new auxiliary qubit to be utilized for its operation.

On Step 182C, the TQP may be inserted into the quantum program, thereby creating am modified quantum program. The TQP may be inserted so as to add to the target qubit(s) (Q) the difference value. In some exemplary embodiments, the modified quantum program may be configured to update the value of Q to be Q=Q+V2−V1. As Q, at the target cycle, C, is valued V1, Q is updated to be Q=V1+V2−V1=V2.

On Step 184C, and similarly to Step 140C, the modified quantum program may be executed a plurality of times to obtain execution results.

Figure 1D:
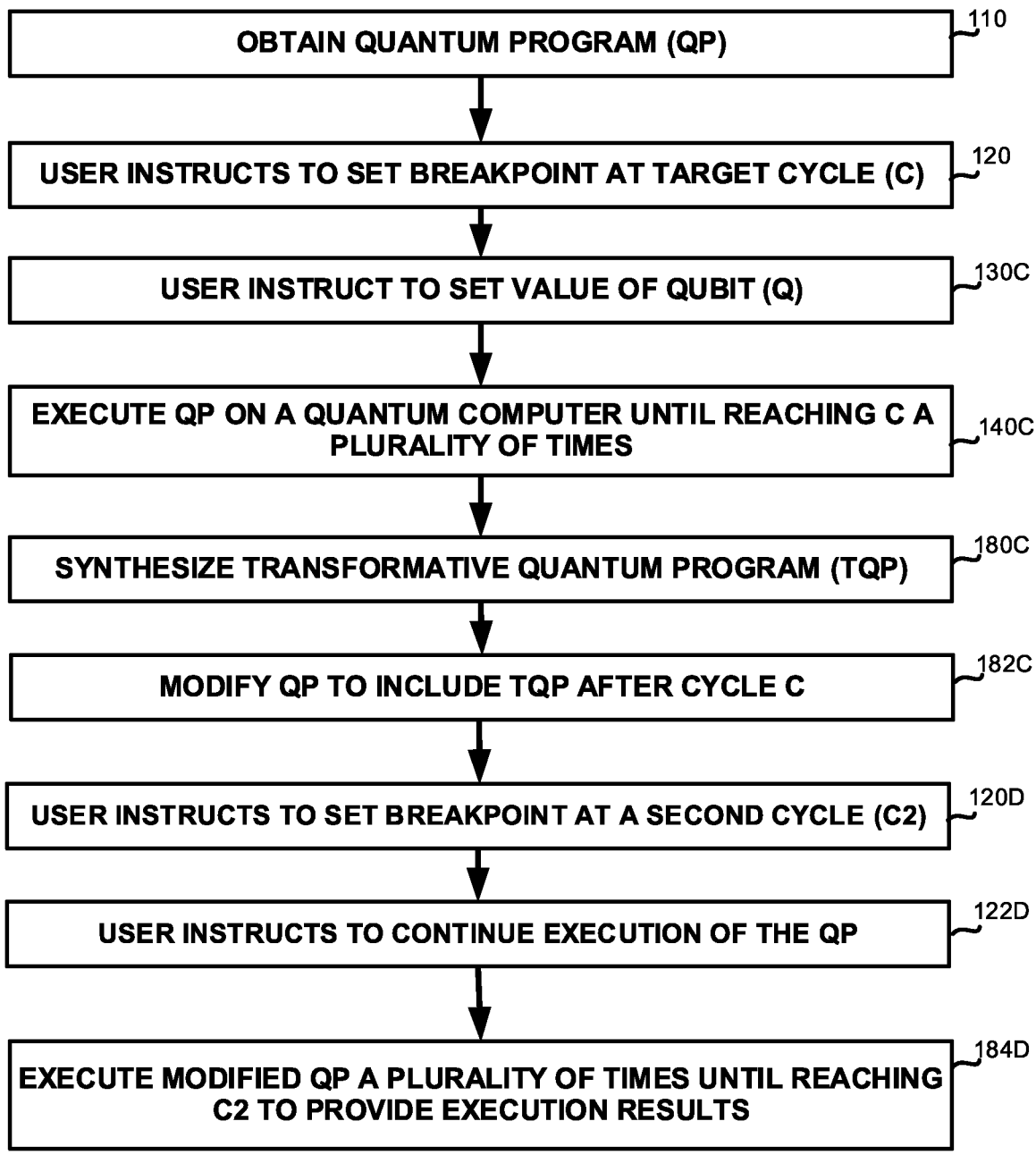

Referring now to FIG. 1D, in which the user does not provide instruction to display the value of Q at cycle C, but merely update the value of Q. Still, Step 140C may be performed to determine the initial value of Q.

It is noted that the modified quantum program may continue to be used for the duration of the debugging session. Hence, the effect of the modification of the quantum program, may appear to persist in the remainder of the debugging session. While the memory area is not updated by the quantum debugger, the user may perceive such modification as appearing to reflect a similar memory update.

FIG. 1D exemplifies this in Steps 120D, 122D, 184D.

After the steps associated with the controlled propagation command are performed (Steps 140C, 180C, 182C), the user may proceed in the same debugging session and provide additional debug commands (120D, 122D). In Step 120D, a breakpoint is set in another cycle (C2), which succeeds the target cycle (C) (e.g., C2>C). In Step 122D, the user instructs the quantum debugger to continue execution. Such commands are performed (Step 184D) while executing the modified quantum program, and not the original quantum program of Step 110, until reaching cycle C2, in which measurements may be taken to provide execution results to the user. It is noted that if further "controlled propagation"

commands are performed, the quantum program may be further modified by introducing additional transformative quantum programs thereto.

Figure 1E:
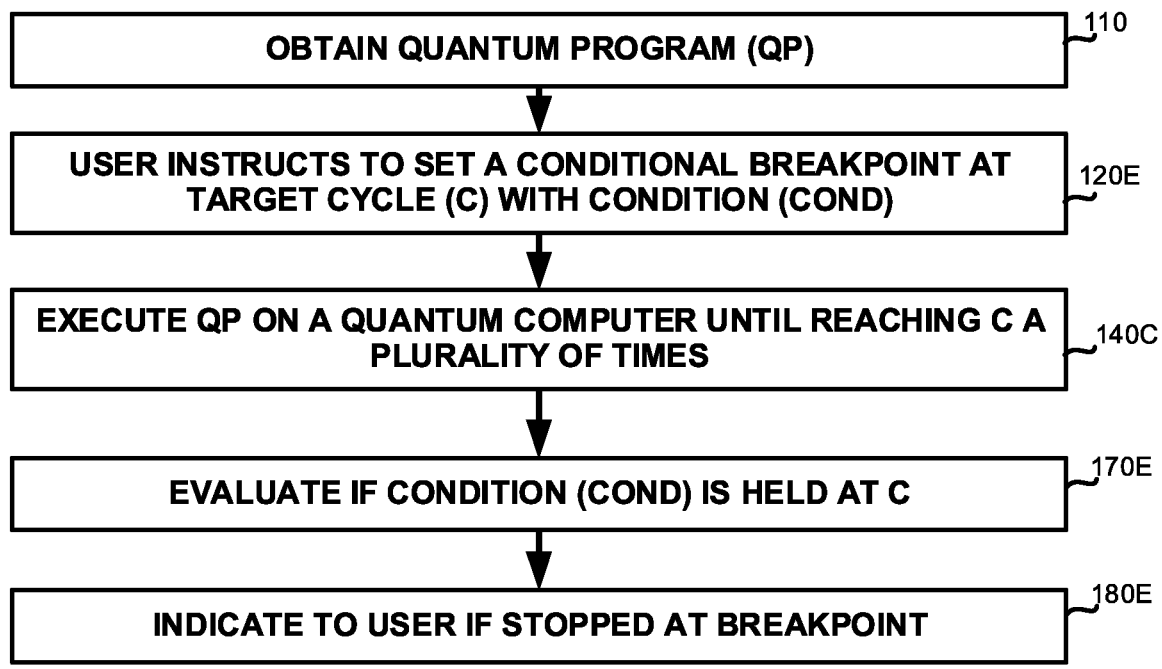

Referring now to FIG. 1E, in which the user may provide a debug command instructing to introduce a conditional breakpoint at a target cycle, C, with a condition, COND. If the condition relates to non-quantum elements, the conditional breakpoint may be evaluated using a single execution of the quantum program. Additionally or alternatively, if the condition relates to quantum elements, such as qubits, the evaluation of the condition may require multiple executions. The quantum program may be executed several times (Step 140C), and the condition may be evaluated to determine if the condition holds (Step 170E). Appropriate output may be presented to the user (Step 180E).

As another example, the conditional breakpoint may be to present the value of qubit Q2 if the value of qubit Q1>q. If Q2 has more bits than Q1 or more complicated distribution, the number of executions required to present the value of Q1 may be different. Assume Q1 is one qubit, and Q2 comprises 10 qubits. First, the quantum program is executed to see if the condition of Q1>q is held. During such executions, the value of Q1 is measured. Potentially, also information about Q2 is obtained during such executions. However, if the condition is held, additional executions may be required in order to collect sufficient measurements regarding Q2, such as additional 1000 executions.

Figure 1F:
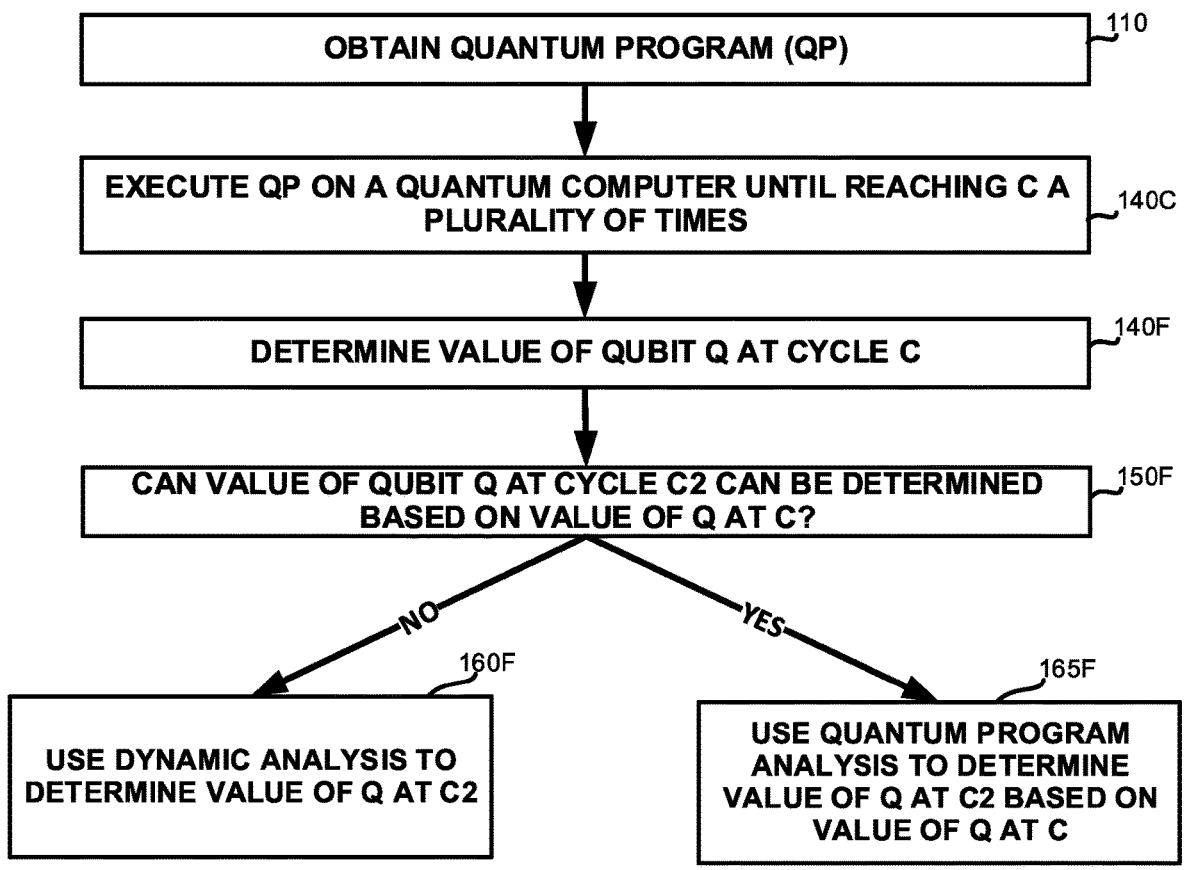

Referring now to FIG. 1F. The value of qubit Q at cycle C may be determined (Step 140F) based on multiple executions of the quantum program (Step 140C). Using the information obtained at cycle C, it may be determined if the value of Q at a different cycle (C2) can be determined using static analysis. If so, static analysis is performed (Step 165F) otherwise, dynamic analysis, in which the quantum program is executed, is utilized (Step 160F).

In some exemplary embodiments, based on information that was gathered at cycle 150, a query regarding cycle 160 may be determined without executing the quantum program. For example, assume Q1 and Q2 are entangled on cycle 150. If between cycles 150 and 160 no operation that affect entanglement is performed regarding such qubits, it may be determined that Q1 and Q2 remain entangled. As another example, if the distribution of Q1 is calculated on cycle 150, and if only simple operations (e.g., non-quantum operations, such as logical gates) are applied on Q1 between cycles 150 and 160, the distribution of Q1 on cycle 160 can be computed without executing the quantum program. For example, assuming the distribution of Q on cycle 150 is the list of pairs ($p_i$, $v_i$), where $p_i$ is the probability and $v_i$ is the valuation, and assuming the non-quantum function applied on Q between cycles 150 and 160 is f( ), then the distribution of Q in cycle 160 may be computed statically as the list of pairs ($p_i$, $f(v_i)$).

In some exemplary embodiments, a graph of entanglement properties may be generated in which nodes represent qubits and edges represent entanglement between the qubits. In some exemplary embodiments, weights of the edges may represent properties of the entanglement relationship between the two qubits, such as phase, number of shmidt coefficients, Von-neumann entropy, or the like.

An entanglement graph computed for cycle 150 may remain unmodified until cycle 160 if the quantum program does not apply any gate that affects entanglement. Additionally, or alternatively, even if such gates are included in the quantum program between cycles 150 and 160, they may only affect a subset of qubits. The sub-graph consisting of the remaining qubits that are unaffected by such gates (e.g., the gates are not applied thereon) may remain unchanged. Hence, computing the full graph for cycle 160 may be performed without investigating entanglement properties of all pairs of qubits.

In some exemplary embodiments, a quantum program may have a reversibility property, enabling to compute the initial state based on the last state. In some cases, the reversibility property may be utilized to compute information regarding a preceding cycle using information of a succeeding cycle. For example, given the information the distribution of qubit Q in cycle 160, and assuming the function between cycle 150 and 160 that affects qubit Q is a simple function without quantum operations (f( ), the distribution of qubit Q in cycle 150 may be computed based on the distribution of qubit Q in cycle 160 and using the function $f^{-1}($ $)$. As another example, entanglement graph of cycle 160 may be utilized to statically compute the entanglement graph of cycle 150.

Figure 2:
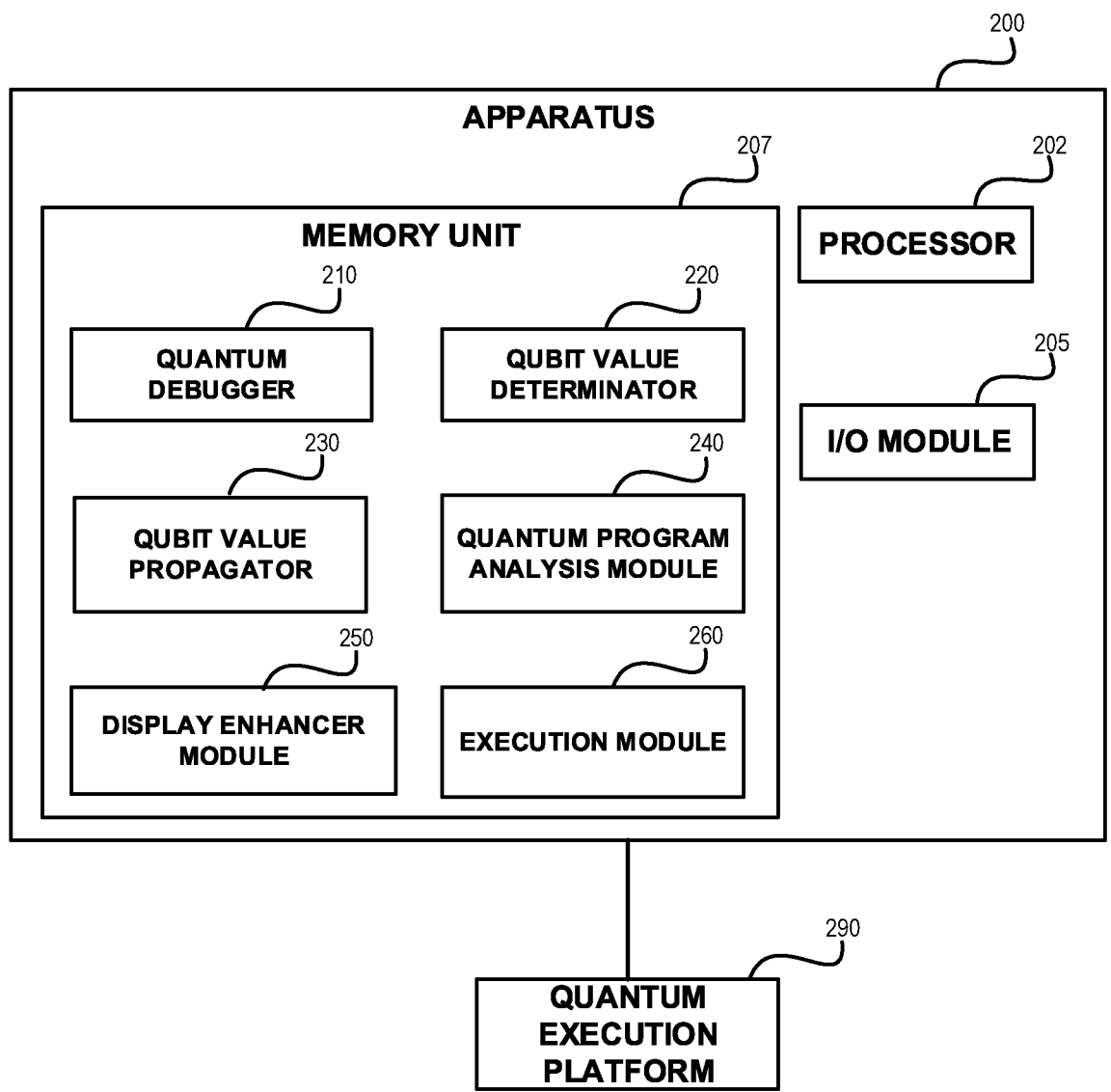
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. The apparatus of FIG. 2 may be configured to perform the steps of the methods of FIGS. 1A-1F.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents. It is noted that Processor 202 may be a traditional processor, and not necessarily, a quantum processor.

In some exemplary embodiments of the disclosed subject matter, Apparatus 200 may comprise an Input/Output (I/O) module 205. I/O Module 205 may be utilized to provide an output to and receive input from a user, such as, for example to obtain debug commands and instructions from a user, retrieve debug instructions via network, receive instructions to start a new debugging sessions or continue an existing debugging session, provide output to the user, indicating execution progress, values of variables of the quantum program, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200. Memory 207 may comprise one or more components as detailed below, implemented as executables, libraries, static libraries, functions, or any other executable components.

In some exemplary embodiments, Quantum Debugger 210 may be configured to enable a user to perform debugging of a quantum program (not shown), that is executed on a quantum computer, such as Quantum Execution Platform 290. The user may initiate debugging sessions in which, the user may set conditional and unconditional breakpoints in specific cycles, set conditional breakpoints regardless of a specific cycle (e.g., in all cycles), perform step forward and backwards operation, perform run operations, request to view a value of a variable, such as a qubit or set of qubits, request to view quantum properties, such as entanglement, density matrix, or the like, in a current cycle, or the like. Quantum Debugger 210 may be configured to provide the user with a user experience (UX) similar to that of a traditional debugger, in which the current state of the program is being tracked and commands affect the current state, such as by causing execution of additional instructions of the quantum program (e.g., step forward or run instructions) or by updating the memory by updating values of variables. Such user experience may be provided regardless of the implementation details of Quantum Debugger 210 in which the quantum program may not be paused in the middle of the execution and may not be resumed, in opposed to traditional debuggers.

In some exemplary embodiments, Execution Module 260 may be configured to execute the quantum program on the target quantum computer, Quantum Execution Platform 290. In some exemplary embodiments, Execution Module 260 may be configured to execute the program once, and obtain the execution result, such as the output state provided by Quantum Execution Platform 290. Additionally or alternatively, Execution Module 260 may be configured to execute the program a multiple times and obtain multiple output results. The results may then be aggregated together, such as by creating an averaged output state, calculating a distribution function, or the like, which may be considered to be the output of the compiled quantum circuit. In some exemplary embodiments, Execution Module 260 may be configured to execute the quantum program until reaching an intermediate state which is not the last, final state of the quantum program.

In some exemplary embodiments, Qubit Value Determinator 220 may be configured to determine a value of a qubit (or set of qubits) in a specific cycle. In some exemplary embodiments, Qubit Value Determinator 220 may be configured to utilize Execution Module 260 to execute the quantum program on Quantum Execution Platform 290 until reaching the specific cycle. In some exemplary embodiments, a plurality of executions may be performed, the number of which may be determined based on desired quality, available and allocated resources, user preferences, or the like. In some exemplary embodiments, the specific cycle may be the cycle that is displayed to the user as the current cycle of the quantum program in the debugging session. In some exemplary embodiments, Quantum Value Determinator 220 may be configured to compute a value of the qubit using quantum tomography. Additionally or alternatively, Value Determinator 220 may be configured to evaluate a property of the qubit (or set of qubits) such as entanglement therebetween, distribution of values, standard deviation of the value, or the like.

In some exemplary embodiments, Qubit Value Determinator 220 may be configured to determine the value of the qubit using a previously determined value of the qubit or other qubits in another cycle, which may be a preceding cycle or a succeeding cycle to the specific cycle. In some exemplary embodiments, it may be determined whether to attempt a static analysis to determine the value of the qubit or to perform dynamic analysis, in which the Execution Module 260 is invoked. In some exemplary embodiments, static analysis may be performed using Quantum Program Analysis Module 240. Quantum Program Analysis Module 240 may be configured to analyze the quantum program and determine a value or property of a qubit based on operations performed thereon between the cycle of interest and another cycle, for which information was previously computed.

In some exemplary embodiments, Qubit Value Propagator 230 may be configured to propagate, in a controlled manner, a desired target value into a qubit in a specific cycle, such as the cycle of the quantum program that is considered by Quantum Debugger 210 as the "current" cycle. In some exemplary embodiments, Qubit Value Propagator 230 may synthesize a transformative quantum program based on the value of the target qubit and based on the target value. The quantum program may be updated to cause the transformative quantum program to be executed after the target cycle. In some exemplary embodiments, a modified quantum program may be generated and reused for the remaining of the debugging session of Quantum Debugger 210, so as to provide the illusion of the value of the qubit being modified in memory mid-execution.

In some exemplary embodiments, in case of backward execution traversal (e.g., step backward) by Quantum Debugger 210, the transformative quantum program may or may not be removed. As an example, if the backward traversal does not backtrack before the cycle in which the new value is propagated, the same modified quantum program may be utilized. If the backward traversal goes to a cycle before the cycle in which the transformative quantum program is implemented, the original quantum program may be utilized. In some cases, a new quantum program may be created, in which the same controlled propagation operation is performed earlier. In some exemplary embodiments, a different transformative quantum program may be synthesized and utilized. Additionally or alternatively, the same transformative quantum program may be utilized. In some exemplary embodiments, a new program can be created in which some operations are reversed. The new quantum program may be composed of several code snippets that are concatenated one after the other: $P_{1...i} \cdot TQP_i \cdot P_{i...j}^{-1}$, where $P_{1...i}$ is the segment of the quantum program from its beginning and until cycle i, in which the propagation of the value was performed. $TQP_i$ is the transformative quantum program that was applied in cycle i. $P_{i...j}^{-1}$ is a quantum program that is an inverse of the quantum program from cycle i to cycle j (j<i), where j is the current cycle in the debugging session. In such a manner, Quantum Debugger 210 may be able to utilize the reversibility property of quantum programs so as to propagate the value in the correct location, and undo all operations other than the propagation operation. Additionally or alternatively, the quantum program that is executed may be $P_{1...j} \cdot TQP_i$, where $P_{1...j}$ is the segment of the quantum program from its beginning and until cycle j, the current cycle of the debugging session, and $TQP_i$ is the transformative quantum program that was applied in cycle i, and which is now applied after cycle j (j<i).

In some exemplary embodiments, Display Enhancer Module 250 may be configured to provide display to the user of Quantum Debugger 210. In some exemplary embodiments, Display Enhancer Module 250 may dilute excessive and non-important information, such as negligible values in a distribution. In some exemplary embodiments, Display Enhancer Module 250 may be configured to display a graphical representation of an entanglement graph to the user. In some exemplary embodiments, the display may aggregate several qubits together, such as qubits that are used in tandem to represent a single variable (e.g., $q_1$, $q_2, \ldots, q_n$ may be utilized together to represent a variable using n-qubits).

In some exemplary embodiments, Apparatus 200 may be utilized with respect to non-deterministic classic software, instead of with respect to quantum program. In some exemplary embodiments, instead of utilizing Quantum Execution Platform 290, Execution Module 260 may utilize a classic execution platform (not shown). In some exemplary embodiments, Execution Module 260 may execute the program using Processor 202 and not using a separate execution platform. Additionally, or alternatively, Qubit Value Propagator 230 may be replaced by a module configured to set a distribution value to a variable, Qubit Value Determinator 220 may be replaced by a module configured to determine a distribution value of a variable, Quantum Program Analysis Module 240 may be replaced be a classic program analysis module, or the like. In some exemplary embodiments, such embodiment may include a classic debugger instead of Quantum Debugger 210, enabling the user to view distribution of variable values of the non-deterministic classic software, to modify the distribution of variable values, or the like.

Figure 3A:
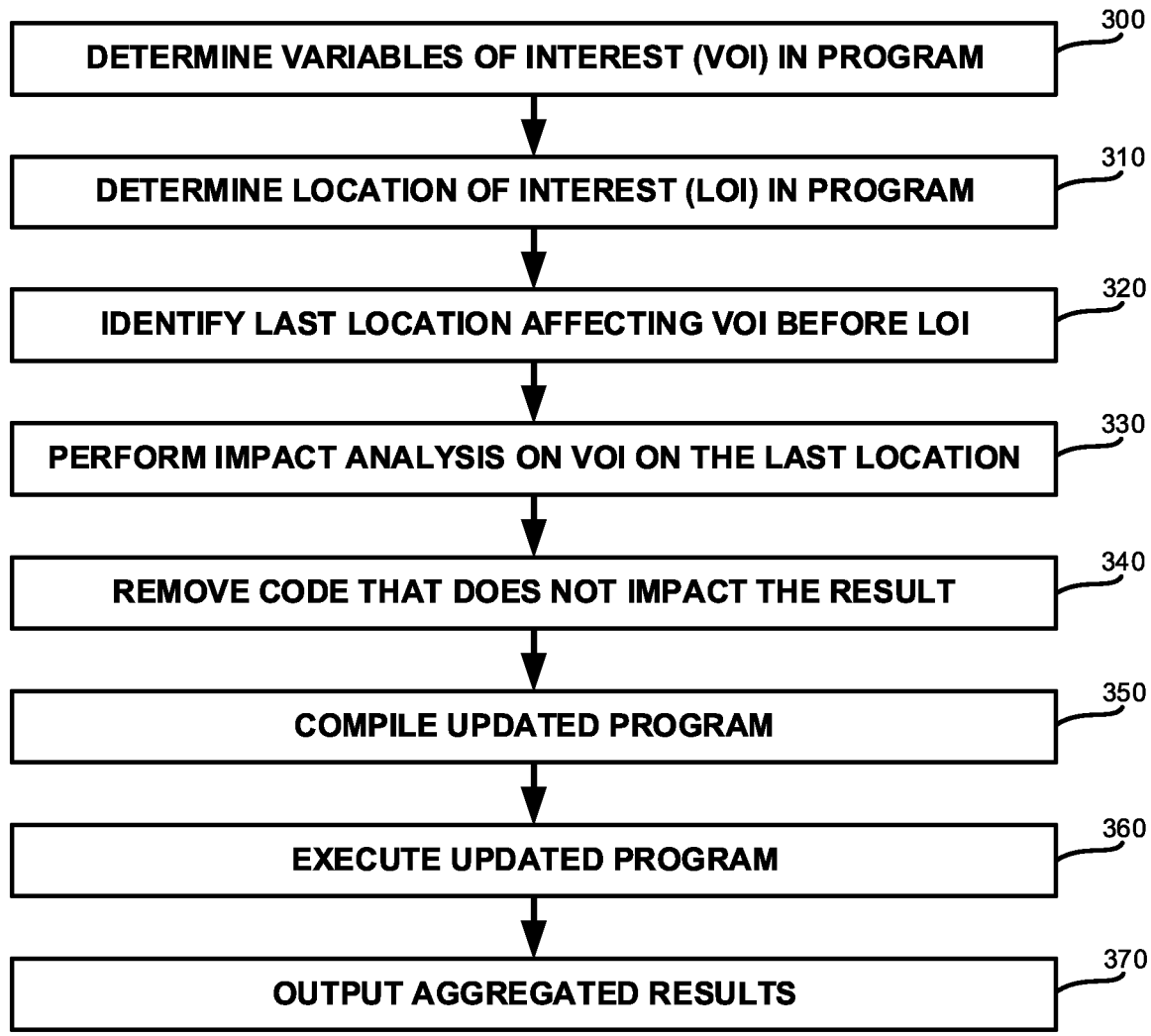
FIGS. 3A-3B show flowchart diagrams of methods, in accordance with some exemplary embodiments of the disclosed subject matter.

Referring now to FIG. 3A showing a flowchart diagram of a method, in accordance with some exemplary embodiments of the disclosed subject matter. It is noted that FIG. 3A is applicable to both quantum programs and classic software. However, for the clarity of disclosure, the method is exemplified using a quantum program.

On Step 300, Variables of Interest (VOI) in the program may be determined. The VOI may be determined based on user instruction. As an example, the user may provide a command requesting to view a value of a variable. Additionally, or alternatively, the user may utilize a debugger and issue a "print" command with respect to a variable, indicating that such variable is a VOI In some exemplary embodiments, the determined VOI may include one variable (e.g., "print v"), several variables (e.g., "print v1+v2"), or the like.

On Step 310, a Location of Interest (LOI) in the program may be determined. The LOI may be a specific location in the program, such as defined by a specific line of code, a specific cycle, a semantic location where a conditional breakpoint is active, or the like. In some exemplary embodiments, the LOI may be at the end of the program. Additionally, or alternatively, the LOI may be at any cycle that is not a terminating cycle. The LOI may be determined based on user instruction, such as user instruction to a debugger, based on the command issued by the user, or the like.

Figure 4A:
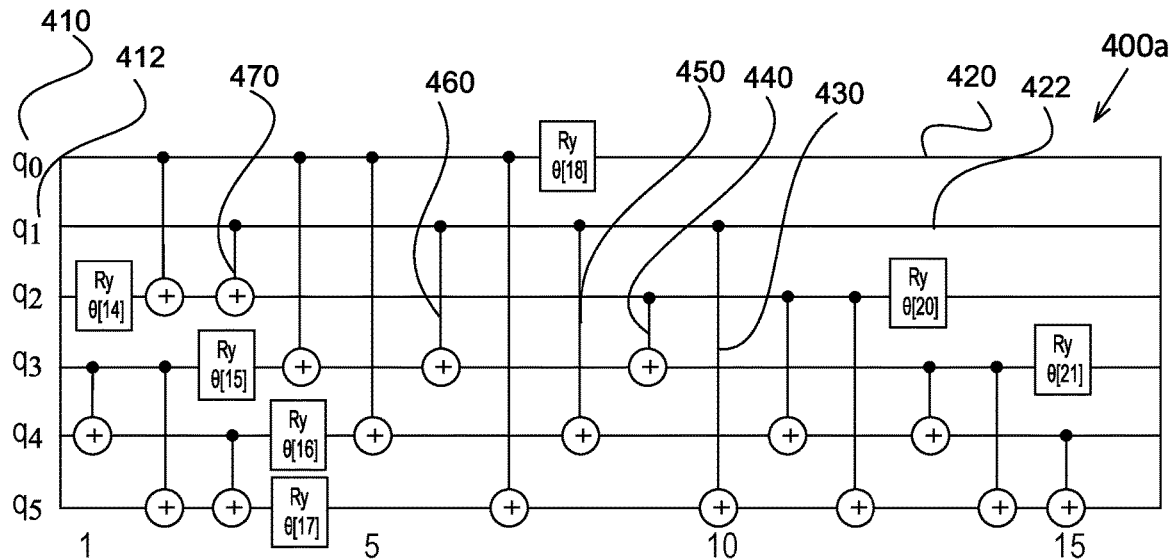
FIGS. 4A-4C show illustration of quantum programs, in accordance with some exemplary embodiments of the disclosed subject matter.

For the purpose of illustrating the disclosed subject matter, the operation of the method of FIG. 3A is exemplified using a Quantum Program (QP) 400a that is illustrated in FIG. 4A. As can be appreciated, Quantum Program 400a utilizes six qubits ($q_0 \ldots q_5$). In Steps 300 and 310, it may be determined that qubits $q_0$ and $q_1$ (410, 412) are of interest in cycle 14 (e.g., values al 420, 422). As an example, the determination may be based on a user instruction to print the values of $q_0$ and $q_1$ in cycle 14. Additionally, or alternatively, the user instruction may be to print the values of $q_0$ and $q_1$ when a conditional breakpoint is active, and it may be determined that the breakpoint is active at cycle 14.

On Step 320, a last location affecting the VOI before the LOI may be determined. In some exemplary embodiments, a last location before the LOI in which the value of any of the VOI is potentially set may be identified.

Referring to FIG. 4A, as can be appreciated the values of any of the VOIs (410, 412) is potentially affected on cycle 10 in view of Gate 430. Gate 430 may be a logical quantum gate operating on both $q_1$ (412) and $q_5$. Hence, Gate 430 may potentially affect and modify the value of $q_1$ (412). Accordingly, the last location affecting the VOI before the LOI is determined to be cycle 10. In some exemplary embodiments, all computations performed after cycle 10 (e.g., computations of cycles 11-14) may be avoided, as such computations will not affect the investigated result.

On Step 330, impact analysis may be performed on the VOI from the last location. In some exemplary embodiments, code that can potentially impact the VOI value at the last location is identified. In some exemplary embodiments, one impact analysis technique may be based on the idea of light cone. The impact analysis may be based on backward light cone. Gate A may be considered as outside the backward light-code of gate B, of the forward light-cone from B does not include gate A. A forward light-cone L may be defined as all gates with at least one input qubit causally connected to the output qubits of W.

In some exemplary embodiments, the impact analysis may be static impact analysis, dynamic impact analysis, a combination thereof, or the like. In some exemplary embodiments, the impact analysis may unroll loops and other iterative code to determine impact of the code in different iterations. As an example, assuming that the software is a simulation that continues day by day. The value of variable x that is computed in each day, is computed based on the value of y at the preceding day. If, in this example, the LOI is the $10^{th}$ day and VOI is x (i.e., we are interested in the value of x on day 10, it may be determined that y is of interest and is part of the VOL However, on day 10, the value of y may be considered as not part of the VOL By unrolling the iterative code, it may be determined that $y_1$ is VOI while $y_{10}$ is not, where $y_i$ is the value of y in the i-th day.

Figure 4B:
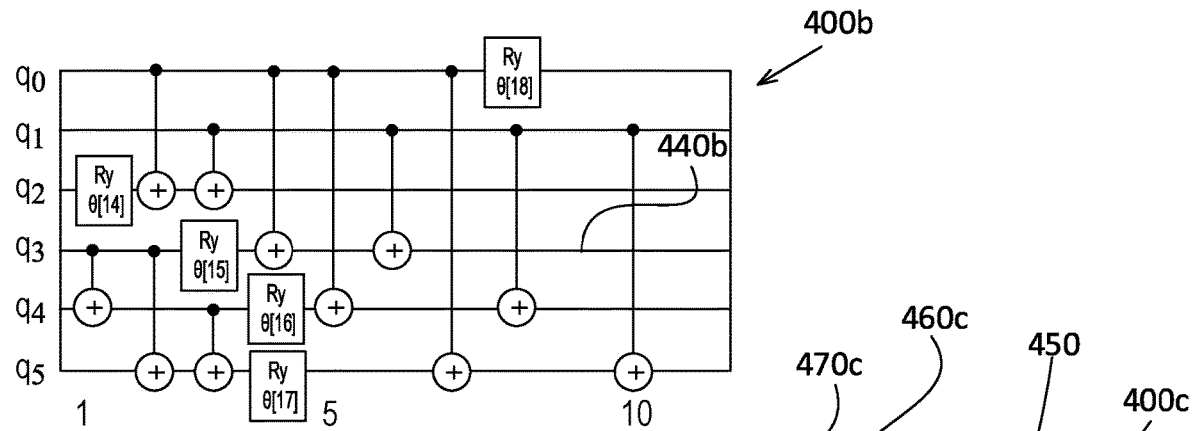

On Step 340, code that does not impact the investigated result may be removed. The code may be identified based on the analysis of Step 330. Referring now to FIG. 4B, showing a modified Quantum Program 400b that is generated based on Quantum Program 400a. In view of the determination of Step 320, Quantum Program 400b does not include any calculation performed after cycle 10 of Quantum Program 400a. Moreover, Gate 440 that connects $q_2$ and $q_3$ at cycle 9 of Quantum Program 400a is not in the light-cone of the VOL Accordingly, such gate is removed from Quantum Program 400b (see 440b). As can be appreciated, in view of the modification, not only is a gate spared, a cycle may be spared as well, as no other computation is required to be performed in cycle 9. Accordingly, Quantum Program 400b may include only 9 cycles, instead of the original 15 cycles of Quantum Program 400a, 14 of which were supposed to be implemented in order to determine the investigated result of $q_0$ and $q_1$ at cycle 14. So, in this example, a reduction in more than 35% of the cycles is achieved.

On Step 350, the updated program may be compiled. In some exemplary embodiments, Quantum Program 400b may be compiled by a compiler so as to provide a quantum program that can be executed on a specific type of target execution platform. In some exemplary embodiments, the compiler may predict small-scale functionality and replace it with a better implementation, as part of local optimizations. It is noted that the same quantum circuit may be compiled to a different implementation for different execution platforms, such as in view of the gates available in the execution platform which are used to implement the functionality of the gates defined in the quantum circuit. Hence, the compiler may create a different quantum circuit having an equivalent functionality to that of the quantum program generated on Step 340, potentially varying in performance.

On Step 360, the compiled updated program may be executed to receive results. The compiled updated program may be executed a plurality of times (e.g., N times). In some exemplary embodiments, the number of times to be executed may be determined a-priori, posteriori, or the like. In some exemplary embodiments, the user may manually define a number of times to execute the program. Additionally or alternatively, a quantitative measurement may be provided to determine, dynamically, if sufficient number of executions were performed. For example, if additional executions do not add significant amount of data, change the already gathered information, or the like, it may be determined that no additional executions are required. In some exemplary embodiments, the executions may be performed until reaching a desired quality level (e.g., confidence level in measurement, estimated statistical deviation, or the like). In some exemplary embodiments, the number of executions to be performed may be based on the resources available for such task.

In some exemplary embodiments, during the execution, the execution cost may be measured and compared with the predicted cost estimation. In some cases, if the optimization performed using the impact analysis (e.g., on Steps 330-340) performs differently than expected (e.g., sub-performs with respect to the expectations), a different optimization may be performed instead of or in addition to the optimization that was already performed. The determination whether to perform such different optimization may be based on the estimated overhead costs and execution costs of additional optimizations. In some exemplary embodiments, the measurement of the actual overhead costs and execution costs of the modified program may be utilized for future predictions, thereby potentially improving the quality of future predictions.

On Step 370, the results from the multiple executions of the updated program (Step 360) are aggregated and outputted. The results may be provisioned to the user, such as in reply to the user inquiry (e.g., user command "print $q_0$, $q_1$@14" requesting to print the values of specific qubits ($q_0$, $q_1$) at a specific cycle (14)). The aggregated result may be the investigated result relating to the VOI at the LOI.

In some exemplary embodiments, the investigation may require the density matrix, or other measurements derivable therefrom, of the VOI at the LOI of the program. As can be appreciated, instead of utilizing the program itself, the disclosed subject matter may create an alternative program ("updated program") that has the same density matrix of the VOI at the LOI as of the original program. It is noted that the alternative program is constructed based on the original program and may, in some cases, be executed faster, may require a reduced amount of resources and qubits, or the like.

Figure 3B:
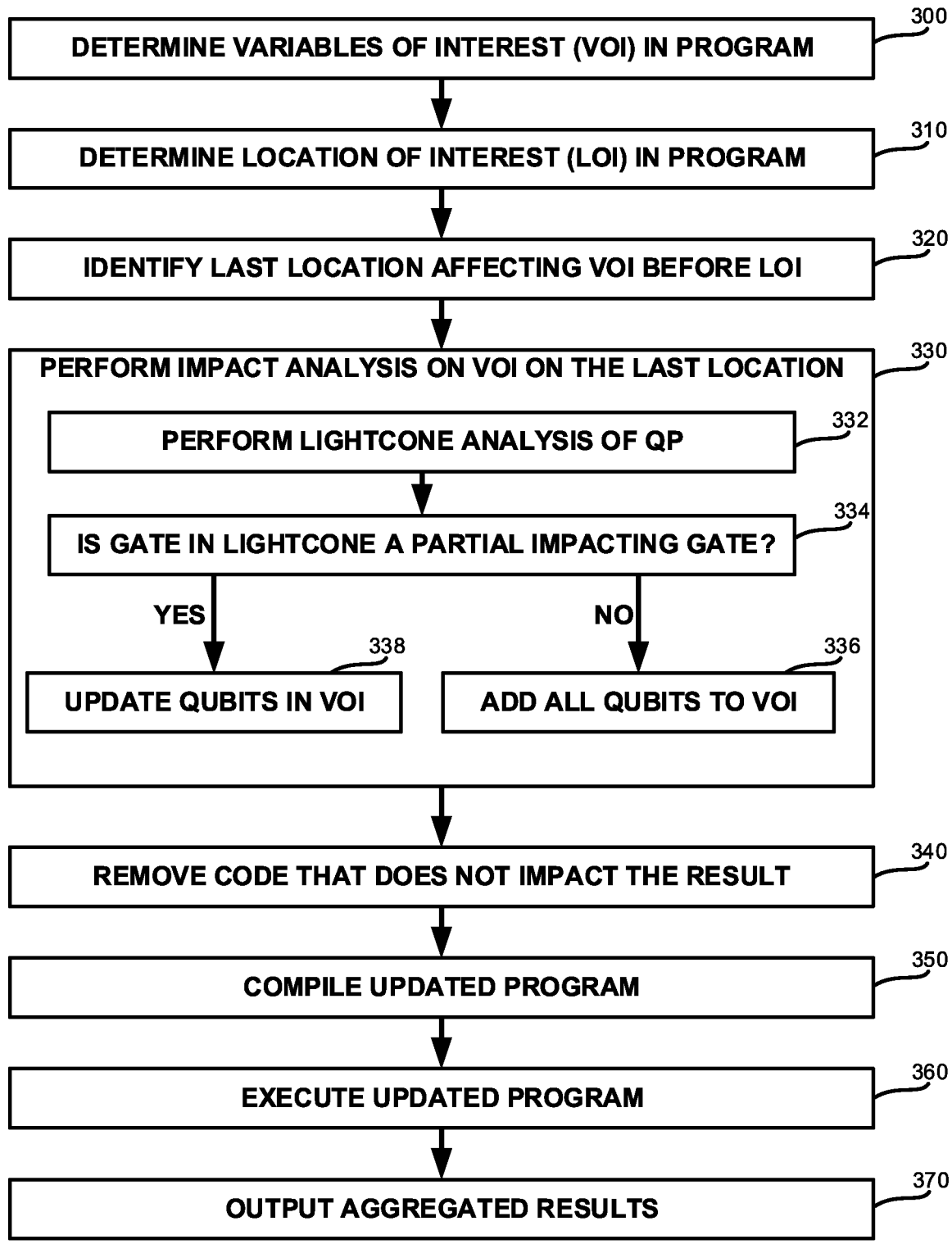

Referring now to FIG. 3B, showing a flowchart diagram of a method, in accordance with some exemplary embodiments of the disclosed subject matter.

On Step 330, the impact analysis is performed using a light-cone analysis. The light-cone analysis identifies all gates in the quantum program that are connected to the inputs of the VOIs at the LOI. In some exemplary embodiments, the light-cone analysis may depend on the type of gate that is connected to the VOL In some exemplary embodiments, an iterative process of performing the light-cone analysis may comprise a procedure in which the gates that are directly affecting the VOI at the LOI are identified. Each such gate may be considered to be of interest and value of qubits at the relevant cycle may be added to the VOI for further analysis, until reaching the initial cycle of the quantum program. In some exemplary embodiments, each gate may be analyzed. If the gate is partial impacting gate, only potentially relevant qubits are added to the VOI (338). If the gate is a full impacting gate, all qubits that are connected to the full impacting fate may be added to the VOI (336). It is noted that the gate being partial impacting gate or full impacting gate may depend on the specific implementation of the quantum computer that would execute the quantum program.

As an example, consider Gate 430 of the quantum program of FIG. 4A. Such a gate may be considered a full impacting gate. Hence, the light-cone analysis may deduce that the value of $q_1$ in cycle 10 may be affected by the values of $q_1$ and $q_5$ in cycle 9.

Figure 4C:
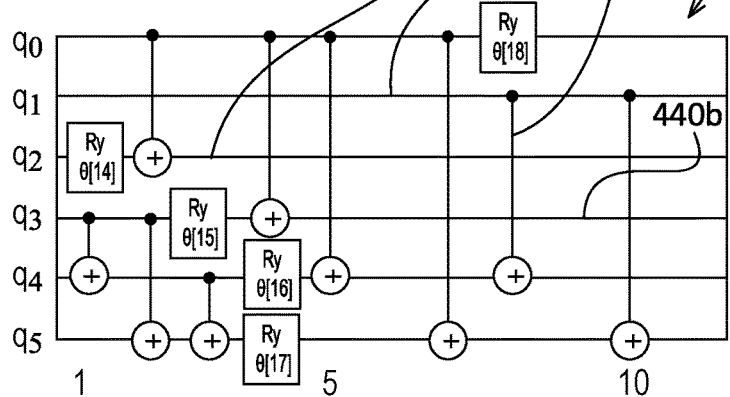

As another example, Gate 450 may be a SWAP gate. Such a gate swaps the values of two qubits (in the illustration $q_1$ and $q_4$), and may be a partial impacting gate. As such, the value of $q_1$ in cycle 9 may be affected by the value of $q_4$ in cycle 8, but is not affected by the value of $q_1$ in cycle 8. Accordingly, FIG. 4C showing a modified Quantum Program 400c that is generated based on Quantum Program 400a. Quantum Program 400c further excludes Gate 470 (see 470c) and Gate 460 (see 460c). Accordingly, the number of cycles can also be reduced from 9 cycles in Quantum Program 400b to 8 cycles in Quantum Program 400c. As can be appreciated, cycle number 6 can be removed due to the removal of Gate 460, while cycle number 3, from which Gate 470 was removed, can not be reduced, due to other gates operating in the same cycle.

Figure 5:
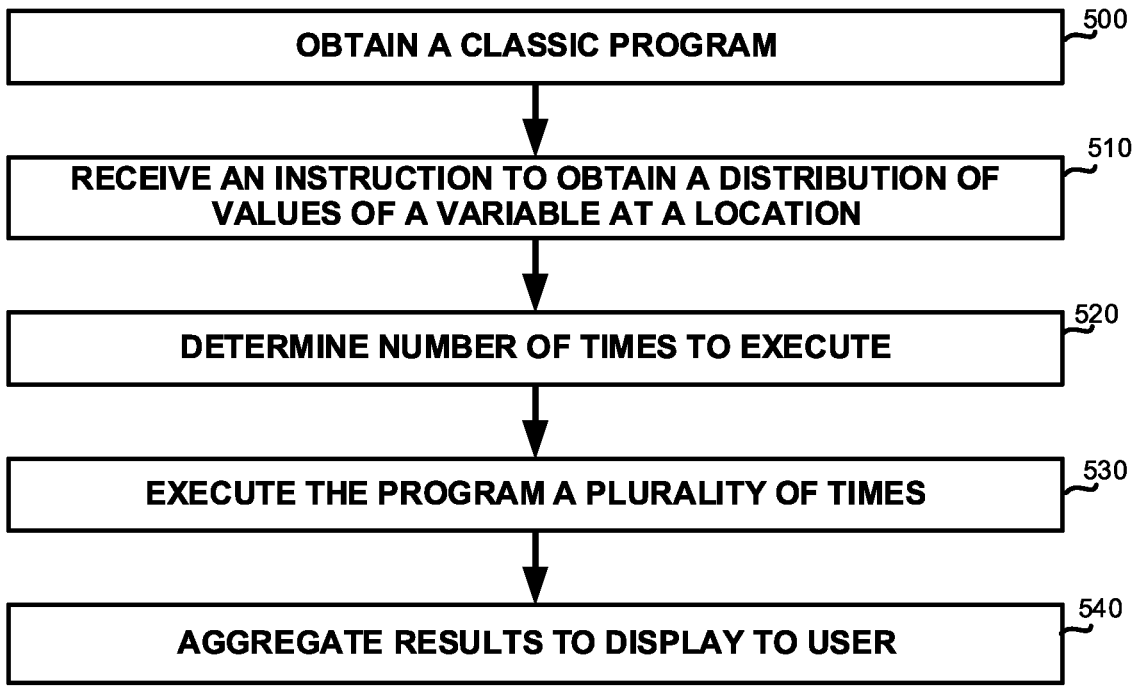
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On Step 500, a classic program is obtained. The classic program may be provided in any programming language, such as C++™, Java™, assembly, or the like. In some exemplary embodiments, the classic program may not utilize qubits. The classic program may be configured to be executed by a classic, non-quantum, execution platform, such as utilizing a digital processor. In some exemplary embodiments, the classic program may be a non-deterministic software, such as a simulation of a complex environment that includes random or non-deterministic information, a software that is based on a stochastic model, or the like.

On Step 510, an instruction to obtain a distribution of values of a variable at a location may be obtained. For example, a programmer may utilize a programming instruction to request that at a specific location, the program would return the distribution of values or otherwise gather such information to determine a desired output. In some exemplary embodiments, the information may be gathered and retained for logging purposes, for analytic purposes, for purposes of validating an underlying model of the classic program, or the like. As another example, the programmer may utilize a debugger to debug the program and may instruct the debugger to provide such information. In some exemplary embodiments, the user may set a breakpoint or otherwise traverse to a specific program location and request such information in the desired location. As another example, the location may be defined using a conditional breakpoint, such that the location is not defined exclusively using a program instruction value, but also combines a semantic condition. In some cases, only a semantic condition may be utilized without relating to a specific location (e.g., whenever the variable "var" is assigned the value "0").

The classic program may be executed a plurality of times (520-530), and the results relevant to the query defined in Step 510 may be aggregated and displayed to the user (Step 540). In some exemplary embodiments, the program may be executed as is. Additionally or alternatively, optimization may be performed, such as to cut-out any code that is irrelevant to the query to speed-up execution. Additionally or alternatively, the number of times to execute the program may be a-priori defined, posteriori determined, or the like. In some exemplary embodiments, the executions may be performed until the aggregated results are within a desired quality level.

Figure 6:
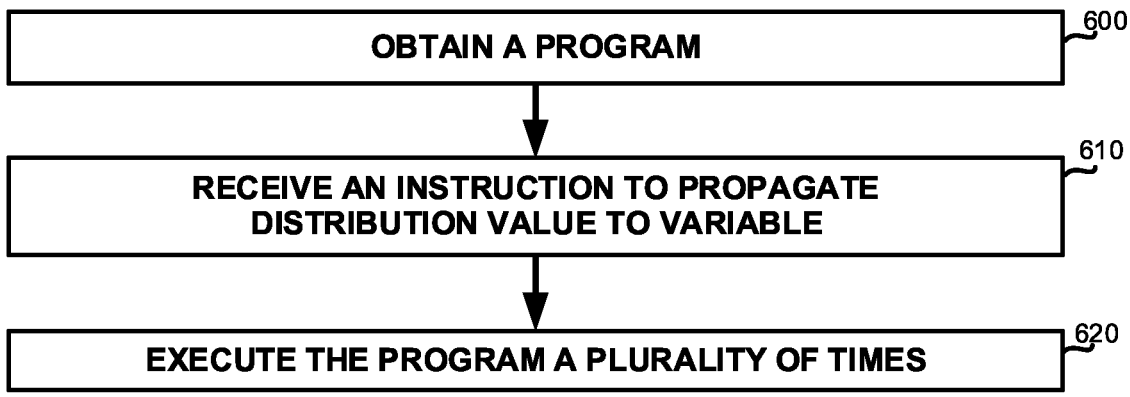
FIG. 6 shows a flowchart diagram of a method, in accordance with some exemplary embodiments of the disclosed subject matter.

Referring now to FIG. 6 showing a flowchart diagram of a method, in accordance with some exemplary embodiments of the disclosed subject matter. FIG. 6 exemplifies the usage of the controlled propagation operation in accordance with the disclosed subject matter. A program may be obtained (600) and a controlled propagation instruction may be provided (610). Accordingly, the program may be executed a plurality of times (620), the number of which may be determined a-priori, posteriori, or the like. During each execution, the value of the variable is a concrete value. The concrete value may be non-deterministically selected at the location in which the controlled propagation instruction is implemented, causing the propagation of the distribution value. Additionally or alternatively, the value may be propagated at the location in which the value is examined or utilized. The value may be propagated directly based on the distribution, such as by sampling a value from the distribution. In such an embodiment, during each execution, a potentially different specific value is given, while adhering to the distribution.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   obtaining a quantum program that involves at least one manipulation of a qubit, wherein the quantum program defines a terminating cycle;
   using a quantum computer, executing the quantum program a plurality of times, wherein during each execution of the quantum program:
      reaching an intermediate state, wherein the intermediate state is obtained prior to reaching the terminating cycle of the quantum program, wherein the intermediate state is a state at a user-defined location, wherein the user-defined location is defined by a user command; and
      performing a measurement of the qubit at the intermediate state, whereby obtaining a plurality of measurements of the qubit at the intermediate state in a plurality of executions of the quantum program; and
   determining a value of the qubit at the intermediate state based on the plurality of measurements obtained of the qubit at the intermediate state.

2. The method of claim 1 further comprises: determining based on a quality measurement, a number of the plurality of times to execute the quantum program.

3. The method of claim 1 further comprises: in response to a command from the user to continue execution of the quantum program after the intermediate state, executing the quantum program a second plurality of times, wherein during each execution of the quantum program in the second plurality of times, the program is executed from an initial state of the quantum program until reaching a second state, wherein the second state is different from the intermediate state and successive thereto, whereby during the second plurality of times, in each execution, the intermediate state is reached prior to reaching the second state.

4. The method of claim 1 further comprises, in response to a command from the user to update a value of the qubit to a modified value:
   synthesizing a transformative quantum program based on the value and the modified value; and
   updating the quantum program to perform the transformative quantum program after the intermediate state, whereby creating a modified quantum program.

5. The method of claim 4 further comprises, in response to a command from the user to continue execution of the quantum program after the intermediate state, executing the modified quantum program.

6. The method of claim 4, wherein the modified quantum program is utilized instead of the quantum program during a debugging session in which the command to update the value of the qubit was provided.

7. The method of claim 1, wherein a conditional breakpoint having a condition on the value of the qubit is defined at the intermediate state, wherein in response to determining the value of the qubit, evaluating whether the condition holds, and in response to determining that the condition holds, indicating to a user that an execution of the quantum program is paused in a debugging session due to the conditional breakpoint.

8. The method of claim 1, further comprises: performing quantum program analysis to determine a value or a property of the qubit at a second state based on the value or the property of the qubit at the intermediate state.

9. A method comprising:
   obtaining a quantum program that involves at least one manipulation of a qubit, wherein the quantum program defines a terminating cycle;
   using a quantum computer, executing the quantum program a plurality of times, wherein during each execution of the quantum program;
      reaching an intermediate state, wherein the intermediate state is obtained prior to reaching the terminating cycle of the quantum program; and
      performing a measurement of the qubit at the intermediate state, whereby obtaining a plurality of measurements of the qubit at the intermediate state in a plurality of executions of the quantum program;
   determining a value of the qubit at the intermediate state based on the plurality of measurements obtained of the qubit at the intermediate state, wherein the value of the qubit indicates a probability distribution of alternative values;
   identifying non-negligible values in the probability distribution, wherein non-negligible and negligible values are determined based on a probability threshold, wherein a value having a probability in the probability distribution that is below the probability threshold is considered negligible and a value having a probability in the probability distribution that is above the probability threshold is considered non-negligible; and
   in response to a command from a user, displaying to the user an abbreviated probability distribution that comprises all the non-negligible values.

10. A method comprising:
obtaining a quantum program that involves at least one manipulation of a qubit, wherein the quantum program defines a terminating cycle;
using a quantum computer, executing the quantum program a plurality of times, wherein during each execution of the quantum program:
reaching an intermediate state, wherein the intermediate state is obtained prior to reaching the terminating cycle of the quantum program; and
performing a measurement of the qubit at the intermediate state, whereby obtaining a plurality of measurements of the cubit at the intermediate state in a plurality of executions of the quantum program;
determining a value of the qubit at the intermediate state based on the plurality of measurements obtained of the qubit at the intermediate state; and
in response to a command from the user to update a value of the qubit to a modified value;
synthesizing a transformative quantum program based on the value and the modified value, wherein transformative quantum program is a quantum program that is configured to transform a zero value of the qubit to the modified value subtracted by the value; and
updating the quantum program to perform the transformative quantum program after the intermediate state, whereby creating a modified quantum program.

11. A method comprising:
obtaining a quantum program that involves at least one manipulation of a qubit, wherein the quantum program defines a terminating cycle;
using a Quantum computer, executing the quantum program a plurality of times, wherein during each execution of the quantum program:
reaching an intermediate state, wherein the intermediate state is obtained prior to reaching the terminating cycle of the quantum program; and
performing a measurement of the qubit at the intermediate state, whereby obtaining a plurality of measurements of the qubit at the intermediate state in a plurality of executions of the quantum program;
determining a value of the qubit at the intermediate state based on the plurality of measurements obtained of the qubit at the intermediate state; and
performing quantum program analysis to determine a value or a property of the qubit at a second state based on the value or the property of the qubit at the intermediate state, wherein the second state precedes the intermediate state, whereby determining the value or the property of a preceding state using information obtained regarding a succeeding state.

12. A non-transitory computer readable medium retaining program instructions, wherein the program instructions are configured, when executed, to cause a processor to perform:
obtaining a quantum program that involves at least one manipulation of a qubit, wherein the quantum program defines a terminating cycle;
causing a quantum computer to execute the quantum program a plurality of times, wherein during each execution of the quantum program:
reaching an intermediate state, wherein the intermediate state is obtained prior to reaching the terminating cycle of the quantum program, wherein the intermediate state is a state at a user-defined location, wherein the user-defined location is defined by a user command; and
performing a measurement of the qubit at the intermediate state, whereby obtaining a plurality of measurements of the qubit at the intermediate state in a plurality of executions of the quantum program; and
determining a value of the qubit at the intermediate state based on the plurality of measurements obtained of the qubit at the intermediate state.

13. The non-transitory computer readable medium of claim 12, wherein the program instructions are configured, when read, to cause a processor to perform: in response to a command from the user to continue execution of the quantum program after the intermediate state, executing the quantum program a second plurality of times, wherein during each execution of the quantum program in the second plurality of times, the program is executed from an initial state of the quantum program until reaching a second state, wherein the second state is different from the intermediate state and successive thereto, whereby during the second plurality of times, in each execution, the intermediate state is reached prior to reaching the second state.

14. A non-transitory computer readable medium retaining program instructions, wherein the program instructions are configured, when executed, to cause a processor to perform:
obtaining a quantum program that involves at least one manipulation of a qubit, wherein the quantum program defines a terminating cycle;
using a quantum computer, executing the quantum program a plurality of times, wherein during each execution of the quantum program:
reaching an intermediate state, wherein the intermediate state is obtained prior to reaching the terminating cycle of the quantum program; and
performing a measurement of the qubit at the intermediate state, whereby obtaining a plurality of measurements of the qubit at the intermediate state in a plurality of executions of the quantum program;
determining a value of the qubit at the intermediate state based on the plurality of measurements obtained of the qubit at the intermediate state, wherein the value of the qubit indicates a probability distribution of alternative values;
identifying non-negligible values in the probability distribution, wherein non-negligible and negligible values are determined based on a probability threshold, wherein a value having a probability in the probability distribution that is below the probability threshold is considered negligible and a value having a probability in the probability distribution that is above the probability threshold is considered non-negligible; and
in response to a command from a user, displaying to the fuser an abbreviated probability distribution that comprises all the non-negligible values.

15. A system comprising:
a memory unit, wherein said memory unit retains a quantum program that involves at least one manipulation of a qubit, wherein the quantum program defines a terminating cycle; and
a quantum computer;
wherein said quantum computer is configured to execute the quantum program a plurality of times, wherein during each execution of the quantum program:
reaching an intermediate state, wherein the intermediate state is obtained prior to reaching the terminating cycle of the quantum program, wherein the intermediate state is a state at a user-defined location, wherein the user-defined location is defined by a user command; and performing a measurement of the qubit at the intermediate state, whereby obtaining a plurality of measurements of the qubit at the intermediate state in a plurality of executions of the quantum program;

wherein said system is configured to determine a value of the qubit at the intermediate state based on the plurality of measurements obtained of the qubit at the intermediate state.

16. The system of claim 15 further comprises a classic processor, wherein said classic processor is configured to execute a quantum debugger, wherein the quantum debugger is configured to cause said quantum computer to execute the quantum program to determine debugging information.

17. A non-transitory computer readable medium retaining program instructions, wherein the program instructions are configured, when executed, to cause a processor to perform:

obtaining a quantum program that involves at least one manipulation of a qubit, wherein the quantum program defines a terminating cycle;

using a quantum computer, executing the quantum program a plurality of times, wherein during each execution of the quantum program:

reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program;

determining a value of the qubit at the intermediate state based on the plurality of measurements obtained of the qubit at the intermediate state; and performing quantum program analysis to determine a value or a property of the qubit at a second state based on the value or the property of the qubit at the intermediate state, wherein the second state precedes the intermediate state, whereby determining the value or the property of a preceding state using information obtained regarding a succeeding state.

18. A non-transitory computer readable medium retaining program instructions, wherein the program instructions are configured, when executed, to cause a processor to perform:

obtaining a quantum program that involves at least one manipulation of a qubit, wherein the quantum program defines a terminating cycle;

using a quantum computer, executing the quantum program a plurality of times, wherein during each execution of the quantum program:

reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program;

determining a value of the qubit at the intermediate state based on the plurality of measurements obtained of the qubit at the intermediate state; and in response to a command from the user to update a value of the qubit to a modified value:

synthesizing a transformative quantum program based on the value and the modified value, wherein transformative quantum program is a quantum program that is configured to transform a zero value of the qubit to the modified value subtracted by the value; and updating the quantum program to perform the transformative quantum program after the intermediate state, whereby creating a modified quantum program.

19. A system comprising:

a memory unit, wherein said memory unit retains a quantum program that involves at least one manipulation of a qubit, wherein the quantum program defines a terminating cycle; and a quantum computer;

wherein said quantum computer is configured to execute the quantum program a plurality of times, wherein during each execution of the quantum program:

reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program;

wherein said system is configured to determine a value of the qubit at the intermediate state based on the plurality of measurements obtained of the qubit at the intermediate state;

wherein, in response to command from the user to update a value of the qubit to a modified value, said system is configured to:

synthesize a transformative quantum program based on the value and the modified value, wherein transformative quantum program is a quantum program that is configured to transform a zero value of the qubit to the modified value subtracted by the value; and update the quantum program to perform the transformative quantum program after the intermediate state, whereby creating a modified quantum program.

20. A system comprising:

a memory unit, wherein said memory unit retains a quantum program that involves at least one manipulation of a qubit, wherein the quantum program defines a terminating cycle; and a quantum computer;

wherein said quantum computer is configured to execute the quantum program a plurality of times, wherein during each execution of the quantum program:

reaching an intermediate state, wherein the intermediate state is obtained prior to reaching the terminating cycle of the quantum program; and performing a measurement of the qubit at the intermediate state, whereby obtaining a plurality of measurements of the qubit at the intermediate state in a plurality of executions of the quantum program;

wherein said system is configured to determine a value of the qubit at the intermediate state based on the plurality of measurements obtained of the qubit at the intermediate state;

wherein said system is configured to perform quantum program analysis to determine a value or a property of the qubit at a second state based on the value or the property of the qubit at the intermediate state, wherein the second state precedes the intermediate state, whereby determining the value or the property of a preceding state using information obtained regarding a succeeding state.

* * * * *